(12) United States Patent
Kanki

(10) Patent No.: US 11,010,035 B2
(45) Date of Patent: May 18, 2021

(54) INFORMATION PROCESSING DEVICE, INFORMATION PROCESSING METHOD, AND RECORDING MEDIUM STORED PROGRAM

(71) Applicant: SHARP KABUSHIKI KAISHA, Sakai (JP)

(72) Inventor: Noriyoshi Kanki, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/413,975

(22) Filed: May 16, 2019

(65) Prior Publication Data

US 2019/0361596 A1 Nov. 28, 2019

(30) Foreign Application Priority Data

May 25, 2018 (JP) .............................. JP2018-100187

(51) Int. Cl.
*G06F 3/14* (2006.01)
*G06F 3/0484* (2013.01)
*G06F 3/0482* (2013.01)
*G06F 16/51* (2019.01)

(52) U.S. Cl.
CPC ........ *G06F 3/04847* (2013.01); *G06F 3/0482* (2013.01); *G06F 3/04845* (2013.01); *G06F 16/51* (2019.01); *G06F 2203/04803* (2013.01)

(58) Field of Classification Search
CPC ........................................................ G06F 3/14
USPC ............................ 715/211, 765, 206; 399/23
See application file for complete search history.

(56) References Cited

U.S. PATENT DOCUMENTS

| | | | |
|---|---|---|---|
| 2005/0097446 A1* | 5/2005 | Fuchino | G06T 11/60 715/211 |
| 2010/0322642 A1* | 12/2010 | Yamauchi | G03G 15/6508 399/23 |
| 2011/0145688 A1* | 6/2011 | Han | H04M 1/72561 715/206 |
| 2012/0050197 A1 | 3/2012 | Kemmochi | |
| 2017/0063942 A1* | 3/2017 | Yamaguchi | H04L 65/4015 |
| 2018/0034879 A1* | 2/2018 | Chegini | H04L 51/10 |
| 2019/0130623 A1* | 5/2019 | Durante | G06T 15/503 |
| 2019/0163707 A1* | 5/2019 | Whigham | G06F 21/604 |

FOREIGN PATENT DOCUMENTS

JP 2012-048610 A 3/2012

\* cited by examiner

*Primary Examiner* — Ruay Ho
(74) *Attorney, Agent, or Firm* — ScienBiziP, P.C.

(57) ABSTRACT

An information processing device is provided with: a display that displays a sheet on which an object can be arranged; and a controller that controls the display, in which the controller causes the display to display a thumbnail image registration field that lists a plurality of preset registration frames for registering, as a bookmark, the sheet displayed on the display, and registers the sheet displayed on the display, as the bookmark to a registration frame selected by a user from among the plurality of registration frames displayed on the display.

9 Claims, 20 Drawing Sheets

FIG. 4

SETTING INFORMATION

| BOOKMARK NUMBER | SHEET NUMBER | DISPLAY MAGNIFICATION | DISPLAY POSITION |
|---|---|---|---|
| 1 | 5 | 150 % | (x1, y1) |
| 2 | 2 | 250 % | (x2, y2) |
| 3 | 3 | 120 % | (x3, y3) |
| 4 | 10 | 200 % | (x4, y4) |
| 5 | | | |
| 6 | | | |
| 7 | | | |
| 8 | | | |
| 9 | | | |
| 10 | | | |

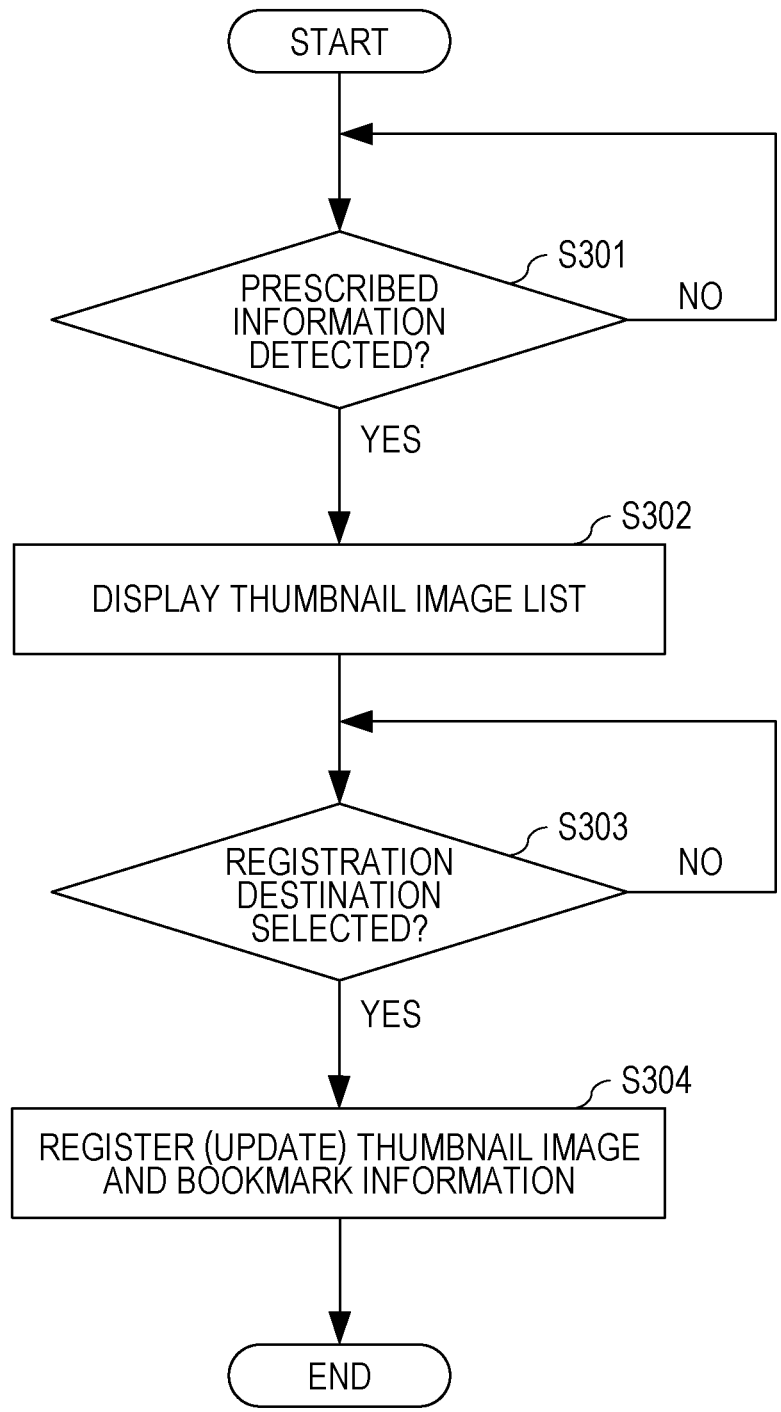

INFORMATION PROCESSING DEVICE, INFORMATION PROCESSING METHOD, AND RECORDING MEDIUM STORED PROGRAM

BACKGROUND

1. Field

The present disclosure relates to an information processing device, an information processing method, and a program.

2. Description of the Related Art

Electronic boards (also referred to as electronic whiteboards or electronic blackboards) are conventionally known as one type of display device (information processing device) that uses a touch panel to receive instruction input (touch) from, a user. Electronic boards are used in meetings and the like. Electronic boards read in position coordinates designated by means of a pen or the like on a touch panel, and display an input trace on a display unit on the basis of information of the position coordinates that have been read in.

Japanese Unexamined Patent Application Publication No. 2012-48610 discloses a technique with which write data created on a touch panel is saved in a storage device in association with a save passcode that has been input in the touch panel, and, in a case where a recovery passcode that is the same as the save passcode has been input in the touch panel, acquires the write data corresponding to the recovery passcode from the storage device and draws on a display device. Furthermore, Japanese Unexamined Patent Application Publication No. 2012-48610 describes that, as an effect of the aforementioned technique, it is possible to conveniently reuse write data merely by inputting a passcode while also ensuring the safety of saved write data.

SUMMARY

Here, for example, the user, when considering a desired section of a sheet (page) displayed on a display unit to be important, saves the sheet in a storage unit so that the part can be viewed again thereafter. In this case, the aforementioned conventional technique is a configuration in which the write data is saved as one file, and therefore, when reusing the write data, it is difficult for the user to easily access the desired section that was considered to be important at the time of the previous use, for example.

The present disclosure provides an information processing device, an information processing method, and a program with which, in an information processing device that is capable of receiving user input on a display unit, it is possible for a specific section of a sheet created by a user and displayed on the display unit to be easily saved, and it is also possible for the user to easily read out and reuse the specific section of the sheet.

An information processing device according to an aspect of the present disclosure is provided with: a display unit that displays a sheet on which an object can be arranged; and a control unit that controls the display unit, in which the control unit causes the display unit to display a registration list that lists a plurality of preset registration frames for registering, as a bookmark, the sheet displayed on the display unit, and registers the sheet displayed on the display unit, as the bookmark to a registration frame selected by a user from among the plurality of registration frames displayed on the display unit.

An information processing method according to another aspect of the present disclosure includes: receiving a registration operation for registering, as a bookmark, a sheet on which an object can be arranged, displayed on a display unit; in a case where the registration operation has been received, causing the display unit to display a registration list that lists a plurality of preset-registration frames for registering, as the bookmark, the sheet displayed on the display unit; and registering the sheet displayed on the display unit, as the bookmark to a registration frame selected by a user from among the plurality of registration frames displayed on the display unit.

A non-transitory recording medium according to another aspect of the present disclosure is a non-transitory recording medium storing thereon a program for causing a computer to execute: receiving a registration operation for registering, as a bookmark, a sheet on which an object can be arranged, displayed on a display unit; in a case where the registration operation has been received, causing the display unit to display a registration list that lists a plurality of preset registration frames for registering, as the bookmark, the sheet displayed on the display unit; and registering the sheet displayed on the display unit, as the bookmark to a registration frame selected by a user from among the plurality of registration frames displayed on the display unit.

BRIEF DESCRIPTION OF THE DRAWINGS

FIG. 4 is a drawing depicting an example of setting information according to embodiment 1 of the present disclosure;

FIG. 20 is a flowchart for describing an example of a procedure for bookmark registration processing in a control device according to embodiment 3 of the present disclosure.

DESCRIPTION OF THE EMBODIMENTS

Hereinafter, embodiments of the present disclosure will be described with reference to the appended drawings. Note that the embodiments described hereinafter are exemplary embodiments of the present disclosure and do not restrict the technical scope of the present disclosure.

Embodiment 1

Figure 1:
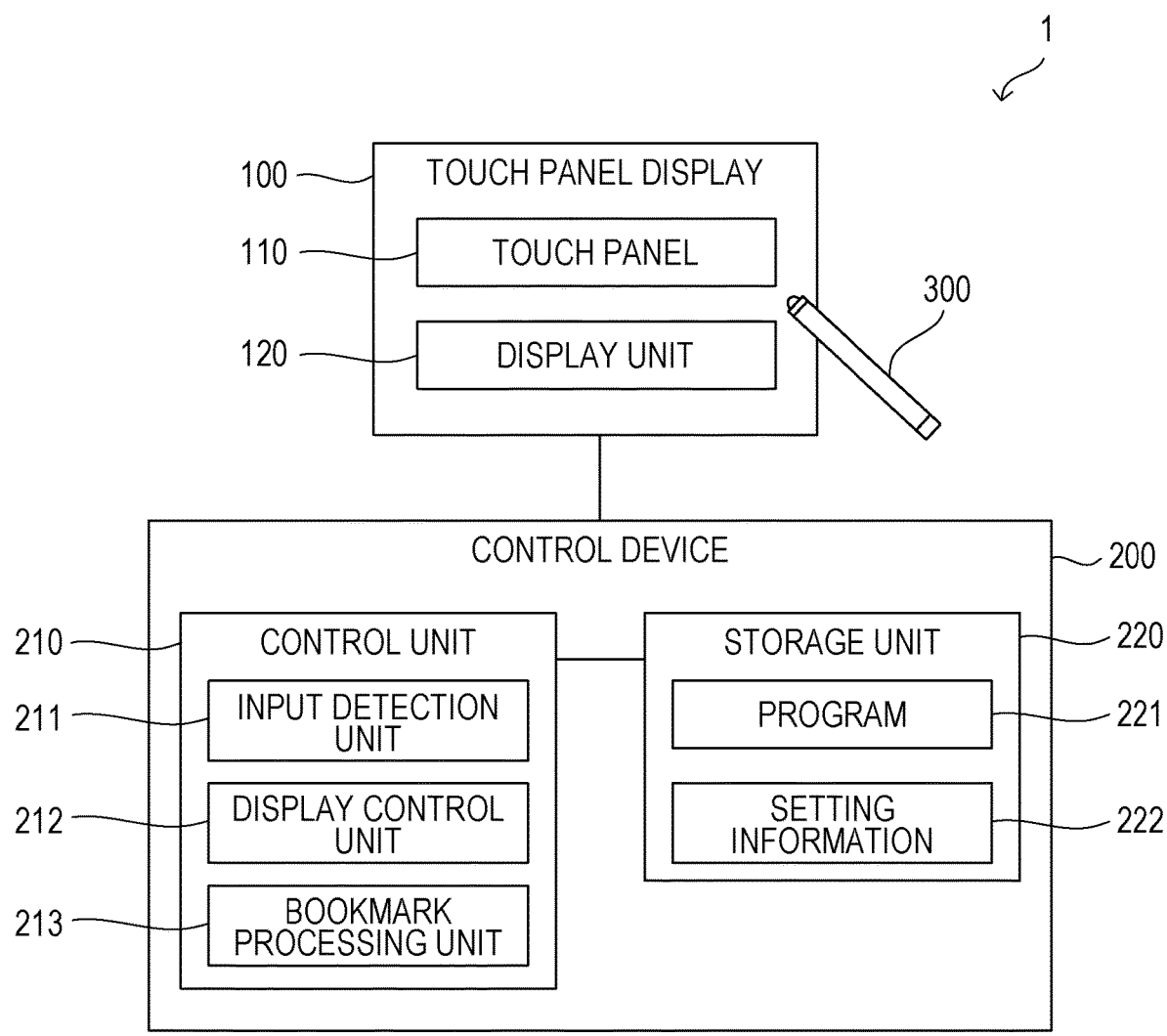
FIG. 1 is a drawing depicting the configuration of an information processing device according to an embodiment of the present disclosure.

As depicted in FIG. 1, an information processing device 1 according to embodiment 1 of the present disclosure is provided with a touch panel display 100, a control device 200, and a touch pen 300. The control device 200 is a computer that is connected to the touch panel display 100 and controls the touch panel display 100. The touch pen 300 is connected to the control device 200 via a network (wired communication or wireless communication). Note that the touch pen 300 may be omitted.

The touch panel display 100 is provided with a touch panel 110 and a display unit 120. The touch panel 110 may be a capacitive touch panel, or may be a pressure-sensitive or infrared touch panel. In other words, it is sufficient for the touch panel 110 to be a device that is capable of receiving operational input of a user such as touch as appropriate. The touch panel 110 is provided on the display unit 120. The display unit 120 is a liquid crystal display, for example. Note that the display unit 120 is not restricted to a liquid crystal display and may be an LED (light emitting diode) display, an organic EL (electro-luminescence) display, a projector, or the like.

The touch panel display 100 may be a device such as a computer, a tablet terminal, a smartphone, or a car navigation device.

The touch pen 300 is a pen for the user to touch (perform input with respect to) the touch panel display 100. In a case where the touch pen 300 is omitted, the user touches (performs input with respect to) the touch panel display 100 using a finger.

As depicted in FIG. 1, the control device 200 is provided with a storage unit 220 and a control unit 210. A computer program 221 that can be executed by the control device 200 is stored in the storage unit 220. The control unit 210 is constituted by a CPU (central processing unit). In a case where activation of the control device 200 has been instructed by means of a user operation (for example, in a case where an undepicted power button has been pressed), the control unit 210 reads the computer program 221 from the storage unit 220 and executes the computer program 221. The control device 200 is thereby activated.

Furthermore, pen software is installed in the storage unit 220 as the computer program 221 that can be executed by the control device 200. When the control device 200 is activated, in a case where activation of the pen software has been instructed by means of a user operation, the control unit 210 reads the pen software from the storage unit 220 and executes the pen software. The pen software is thereby activated on the control device 200.

The control unit 210 is provided with an input detection unit 211, a display control unit 212, and a bookmark processing unit 213. The control unit 210, for example, controls the displaying of an image that has been drawn or input on the touch panel display 100, and controls the displaying of an image that has been input from another image input device.

The input detection unit 211 detects the input of the touch pen 300 on the touch panel display 100. Specifically, the input detection unit 211 detects position coordinates that have been input (designated) by means of the touch pen 300 or a finger of the user on the touch panel 110.

The display control unit 212 causes a display screen 10 that includes a sheet 10a to be displayed on the display unit 120. For example, the display control unit 212 causes the display screen 10 depicted in FIG. 2 to be displayed on the display unit 120 when the pen software is activated in the control device 200. Furthermore, the display control unit 212 causes an input trace to be displayed on the display unit 120 on the basis of the position coordinates detected by the input detection unit 211.

Figure 2:
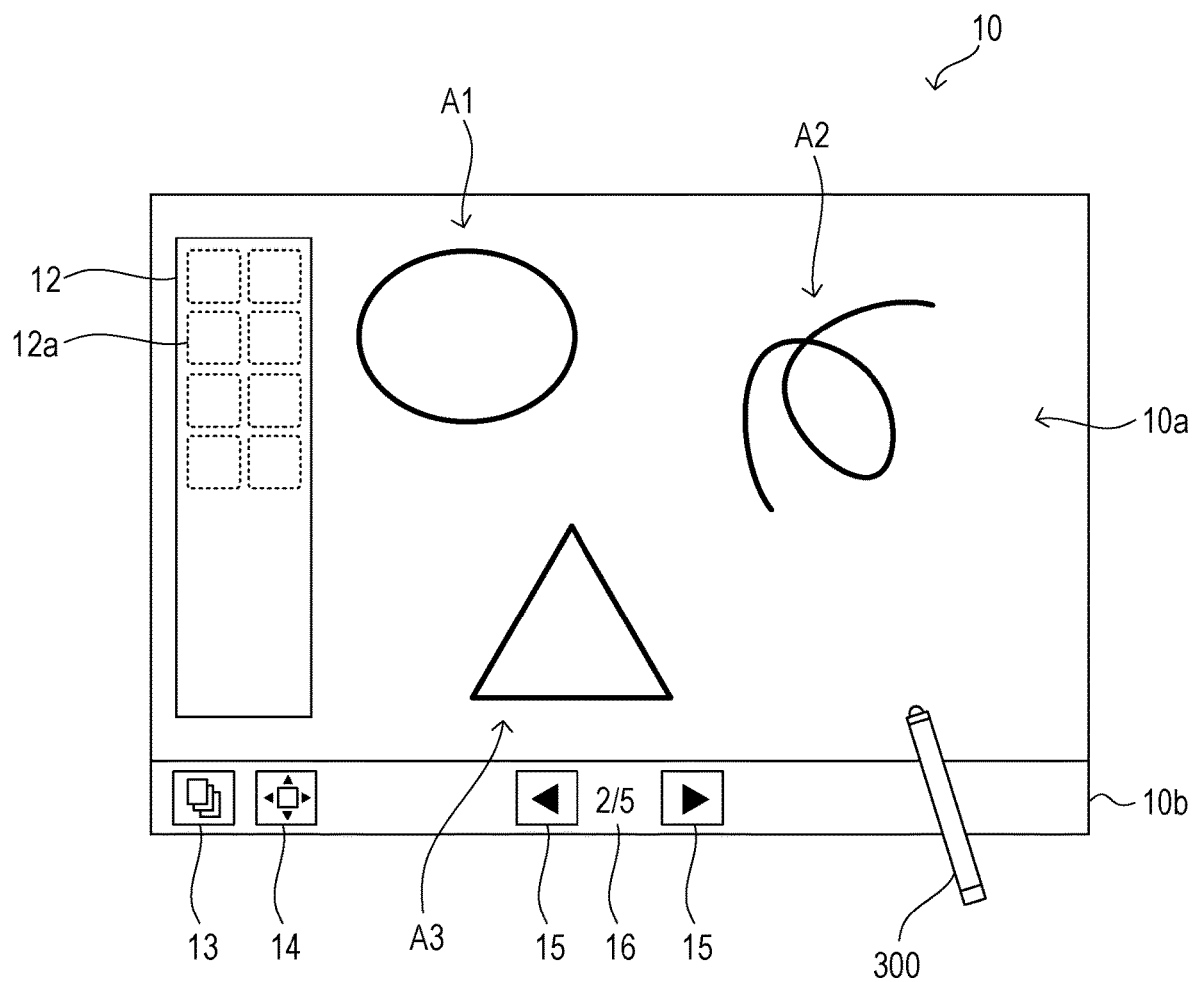
FIG. 2 is a drawing depicting an example of a display screen displayed on a display unit according to an embodiment of the present disclosure.

As depicted in FIG. 2, the display screen 10 includes the sheet 10a, a tool bar 10b, a menu screen 12, and a plurality of icons 12a included in the menu screen 12. The sheet 10a is arranged in the upper section of the display screen 10, and the tool bar 10b is arranged in the lower section of the display screen 10. The sheet 10a corresponds to a board (for example, a whiteboard) region that makes up the touch panel 110.

The user is able to draw (input) drawing information such as text by means of the touch pen 300 on the sheet 10a (board). FIG. 2 depicts drawing information that has been drawn by the user by means of the touch pen 300. In a case where the user has drawn drawing information by means of the touch pen 300 on the sheet 10a, the input detection unit 211 detects the input (position coordinates) of the touch pen 300, and the display control unit 212 causes an input trace to be displayed on the display screen 10 (sheet 10a) of the display unit 120 on the basis of the position coordinates detected by the input detection unit 211. Furthermore, an image that is input from the aforementioned image input device is displayed on the sheet 10a. In this way, the sheet 10a displayed on the display unit 120 is configured so that objects such as drawings and images can be arranged thereon. Three objects A1, A2, and A3 are arranged on the sheet 10a depicted in FIG. 2.

The icons 12a are shortcut icons for executing specific functions in the pen software and are arranged in plurality corresponding to the functions. The functions include, for example, "open file", "save file", "print", "draw line", "eraser", and the like. The user is able to add desired functions as appropriate.

A plurality of operation buttons for executing functions for operating the display screen 10 are arranged in the tool bar 10b. FIG. 2 depicts operation buttons 13 to 15 as examples. The operation button 13 is an operation button for listing and displaying, using thumbnail images, a plurality of sheets 10a (pages) displayed on the display screen 10. The operation button 14 is an operation button for causing an enlargement menu 20 (see FIG. 3 and the like) to be displayed on the display screen 10. The operation buttons 15 are operation buttons for moving the number of the sheet 10a (sheet number) displayed on the display screen 10 up or down (turning the page). The number of the sheet 10a (page) currently displayed on the display screen 10 is displayed between the two operation buttons 15. FIG. 2 depicts that the second sheet 10a (second page) is being displayed from among a total of five sheets 10a (total of five pages).

Other operation buttons may be arranged in the tool bar 10b. For example, an operation button that causes a setting screen for the pen software to be displayed, an operation button for storing the pen software in a task tray, an operation button for terminating the pen software, or the like may be arranged in the tool bar 10b.

On the display screen 10 depicted in FIG. 2, for example, when the user touches (selects) the menu screen 12 or the like with a pointing medium (the pen tip of the touch pen 300 or a fingertip of the user), the display control unit 212 carries out processing that corresponds to the touch. Furthermore, for example, when the user touches the operation button 14 with the pointing medium, the display control unit 212 causes the enlargement menu 20 depicted in FIG. 3 to be displayed on the display screen 10. On the display screen 10, the enlargement menu 20 may be displayed superposed on the sheet 10a or may be displayed outside the region of the sheet 10a. The enlargement menu 20 is an operation screen that receives an operation for registering, as a bookmark, the sheet 10a displayed on the display screen 10 of the display unit 120.

Figure 3:
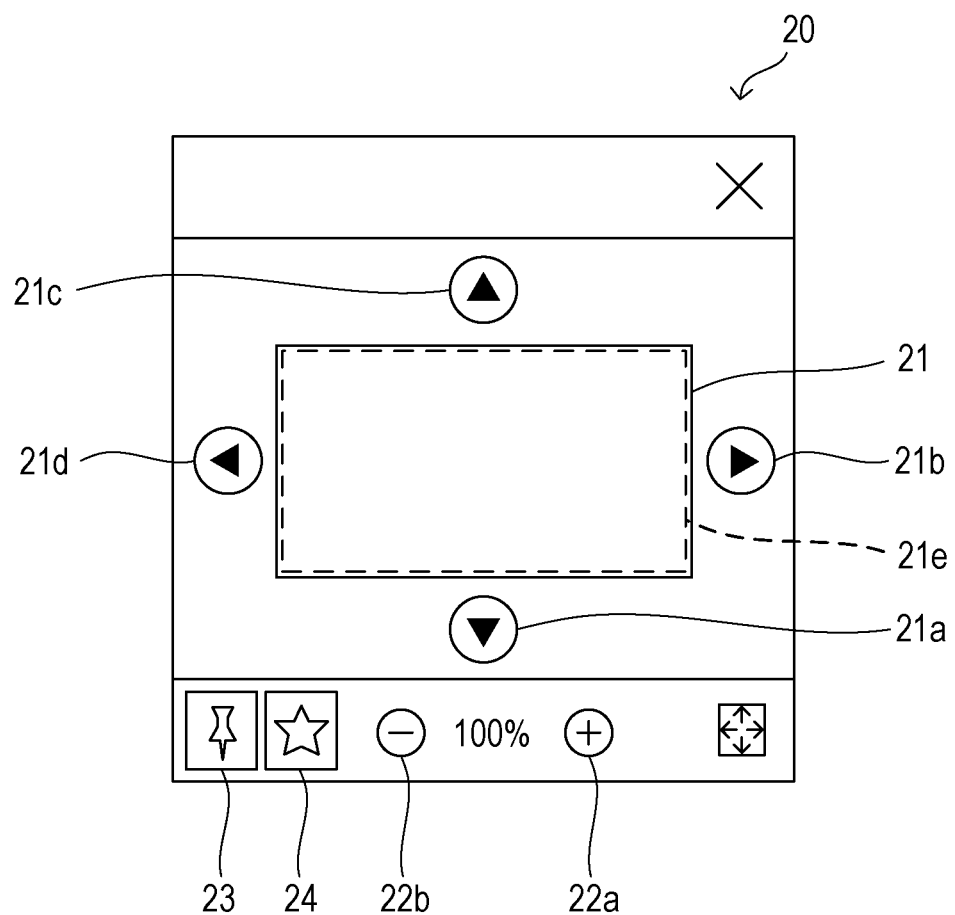
FIG. 3 is a drawing depicting an example of an enlargement menu displayed on a display unit according to embodiment 1 of the present disclosure.

As depicted in FIG. 3, the enlargement menu 20 includes a display region 21 (an example of a display unit of the present disclosure), movement buttons 21a to 21d (corresponding to a position operation unit of the present disclosure), magnification alteration buttons 22a and 22b (corresponding to a magnification operation unit of the present disclosure), a bookmark registration button 23 (corresponding to a registration operation unit of the present disclosure), and a bookmark read button 24.

The display region 21 displays the entire sheet 10a. Furthermore, the display screen 10 displays a region surrounded by a dashed frame 21e from within the region of the entire sheet 10a displayed in the display region 21. Thus, in a case where the display region 21 and the dashed frame 21e coincide (see FIG. 3), the region of the entire sheet 10a is displayed on the display screen 10.

The movement buttons 21a to 21d are buttons that receive a movement operation (an example of an alteration operation of the present disclosure) for moving the region displayed on the display screen 10 (the region surrounded by the dashed frame 21e) from within the region of the entire sheet 10a displayed in the display region 21. For example, in a case where the user has touched (selected) the movement button 21b, the dashed frame 21e moves to the right side and the display control unit 212 causes the right side of the sheet 10a to be displayed on the display screen 10, and in a case where the user has touched the movement button 21c, the display control unit 212 causes the upper side of the sheet 10a to be displayed on the display screen 10.

Furthermore, in a case where the user has touched a movement button for a certain direction from, among the movement buttons 21a to 21d while the sheet edge in the direction in question is displayed in the display region 21, the display control unit 212 causes the sheet 10a to be displayed on the display screen 10 with the size of the sheet 10a being enlarged. For example, in a case where the user has touched the movement button 21d when an edge section (for example, the left edge section) of the sheet 10a is being displayed in the display region 21, the display control unit 212 causes the sheet 10a to be displayed on the display screen 10 with the size of the sheet being enlarged at the left side. In other words, the movement buttons 21a to 21d also have a function for enlarging the size of the sheet 10a.

The magnification alteration buttons 22a and 22b are buttons for receiving an alteration operation (an example of an alteration operation of the present disclosure) for enlarging or shrinking the sheet 10a displayed on the display screen 10. For example, each time the user touches the magnification alteration buttons 22a and 22b, the display control unit 212 causes the image of the sheet 10a to be enlarged or shrunk by 25% between 50% and 400%. In a case where the display magnification of the sheet 10a has been altered on the display screen 10, the region displayed on the display screen 10 from within the region of the entire sheet 10a displayed in the display region 21 is indicated by the dashed frame 21e.

An operation to move the display region of the sheet 10a or alter the display magnification (enlarge or shrink) of the display region on the display screen 10 may be carried out by means of a gesture operation (a swipe operation, a pinch-in operation, or a pinch-out operation) performed by the user on the touch panel 110.

The bookmark registration button 23 is a button that receives a registration operation for registering, as a bookmark, the sheet 10a currently displayed in the display region 21 and on the display screen 10. In a case where the user has touched the bookmark registration button 23, the display control unit 212 causes a thumbnail image registration field 17 (see FIG. 9) for bookmark registration to be displayed, and the bookmark processing unit 213 registers the sheet 10a currently displayed in the display region 21 and on the display screen 10, to a registration frame (described later) selected by the user from within the thumbnail image registration field 17, in the current display state.

Furthermore, the bookmark processing unit 213 stores, in the storage unit 220 (see FIG. 1), setting information 222 (bookmark information) indicating the current display state that has been altered based on the movement operation and the alteration operation received by the enlargement menu 20. For example, in a case where the bookmark registration button 23 has been touched in a state in which the display magnification has been enlarged (for example, 250%) by means of the magnification alteration button 22a, the bookmark processing unit 213 stores setting information 222 indicating the enlarged and altered display magnification ("250%") in the storage unit 220. Furthermore, for example, in a case where the bookmark registration button 23 has been touched in a state in which the display position of the sheet 10a has been altered by means of the movement buttons 21a to 21d, the bookmark processing unit 213 stores setting information 222 indicating the altered display position (position coordinates) in the storage unit 220. Moreover, in a case where the bookmark registration button 23 has been touched in a state in which both the display magnification and display position have been altered, the bookmark processing unit 213 stores setting information 222 indicating the altered display magnification and display position in the storage unit 220. Note that the display position indicates the position of the region surrounded by the dashed frame 21e in the region of the entire sheet 10a, Furthermore, in a case where the bookmark registration button 23 has been touched without the display state of the sheet 10a displayed on the display screen 10 having been altered, the bookmark processing unit 213 stores setting information 222 (bookmark information) indicating the display state in the storage unit 220.

Furthermore, in a case where the bookmark registration button 23 has been touched, the bookmark processing unit 213 includes information of the number of the currently displayed sheet 10a (page) in the setting information 222 and stores such in the storage unit 220.

FIG. 4 is a drawing depicting an example of the setting information 222. As depicted in FIG. 4, the setting-information 222 includes information such as a bookmark number, a sheet number, a display magnification, and a display position. The bookmark number is a registration number of a bookmark. The number of bookmarks that can be registered is set in advance and is set to 10, for example. The user registers a bookmark by selecting a bookmark number (registration frame) of a desired registration destination. FIG. 4 depicts that bookmark numbers "1" to "4" have been registered and bookmark numbers "5" to "10" are unregistered. The user may update to a new sheet 10a by selecting a registered bookmark number, and may register a new sheet 10a by selecting an unregistered bookmark number.

The bookmark read button 24 is an operation button for reading out one or more sheets 10a registered as bookmarks. For example, in a case where the user has touched (an example of a selection operation of the present disclosure) the bookmark read button 24, the display control unit 212 lists and displays the one or more sheets 10a registered as bookmarks, as thumbnail images. In a case where the user has touched a desired thumbnail image from among the thumbnail images listed and displayed, the display control unit 212 causes the sheet 10a corresponding to the touched thumbnail image to be displayed on the display unit 120 in a display state that corresponds to the setting information 222 (display magnification and display position) of the sheet 10a.

[Bookmark Registration Processing]

Figure 5:
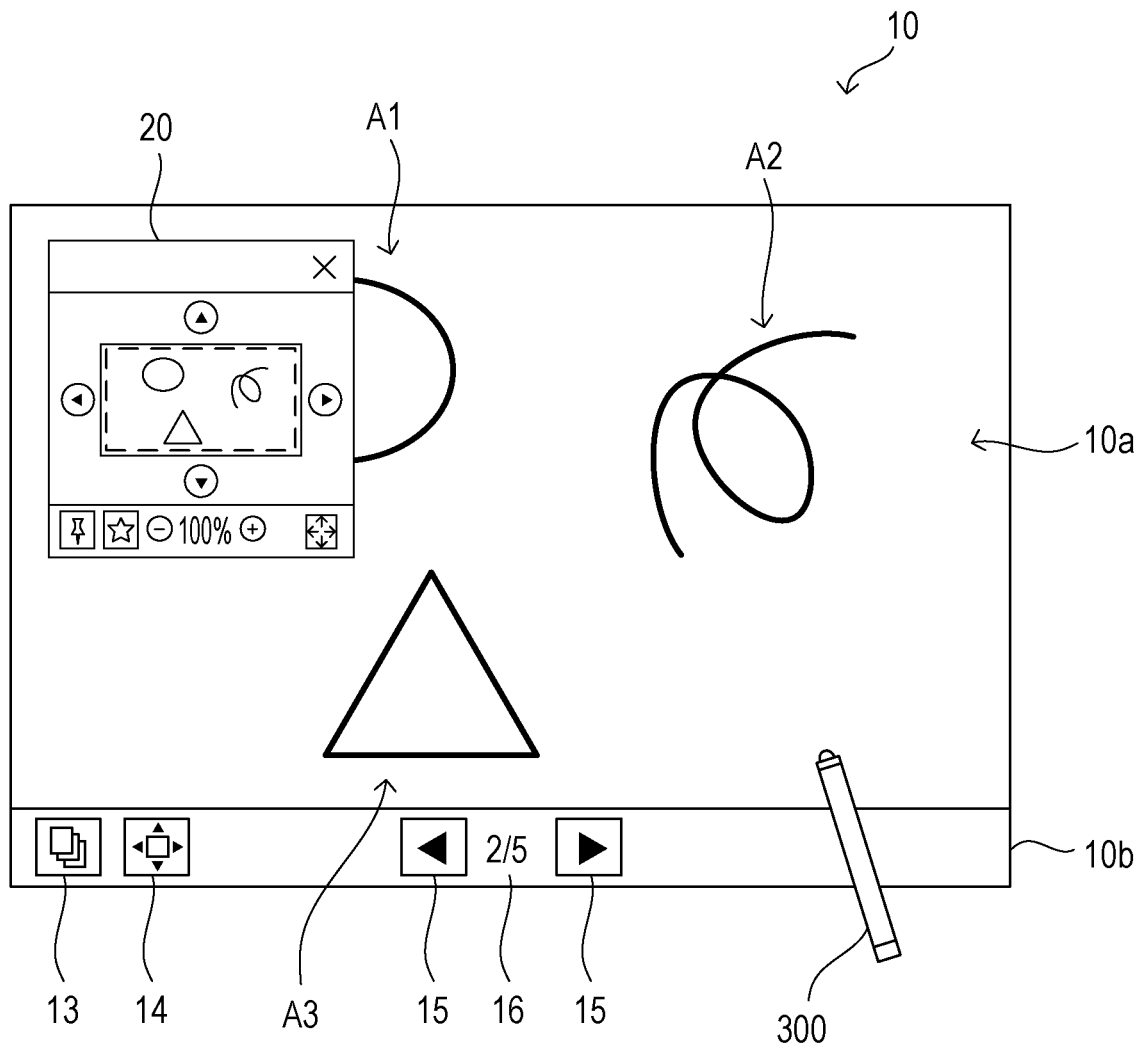
FIG. 5 is a drawing depicting an example of a display screen displayed on the display unit according to embodiment 1 of the present disclosure.
Figure 6:
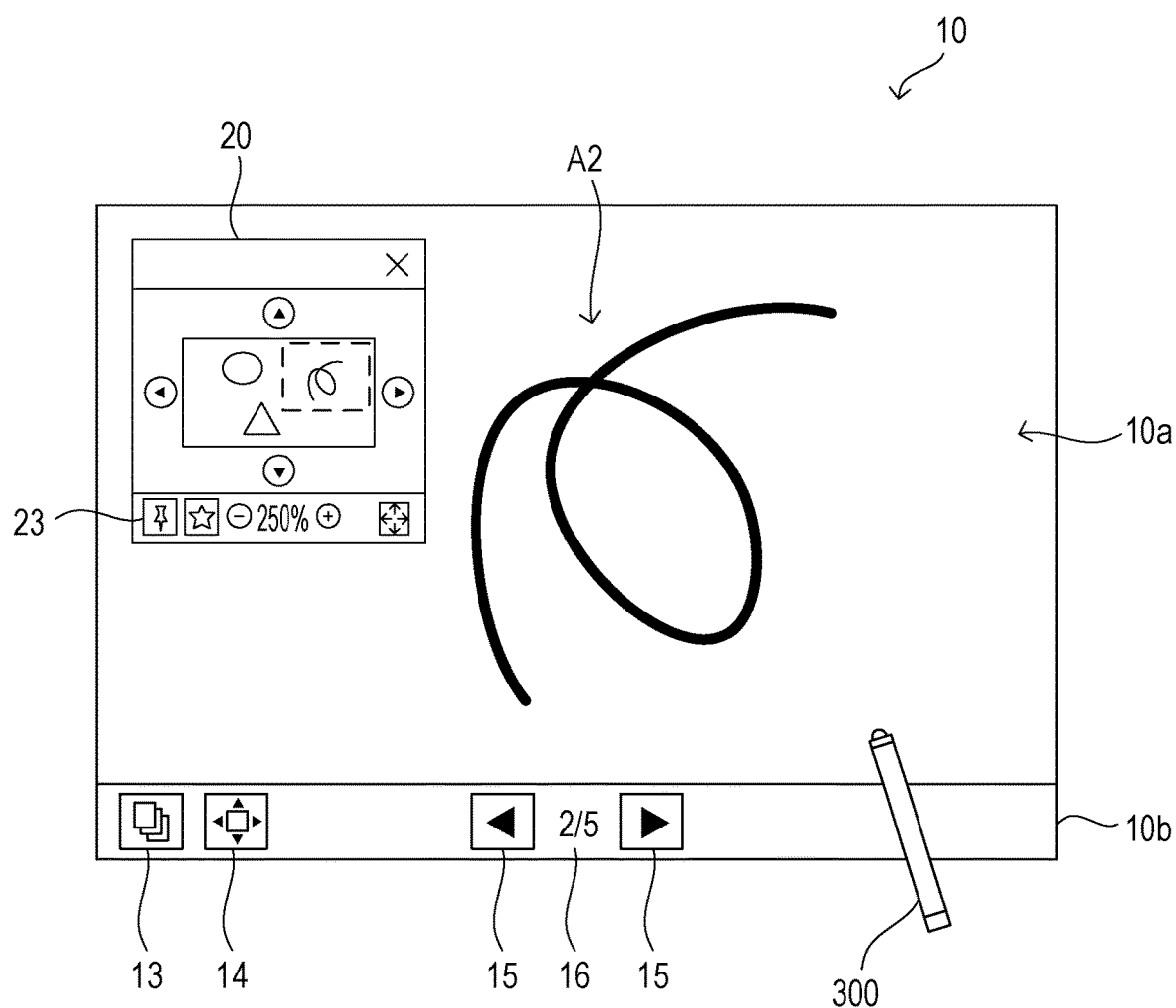
FIG. 6 is a drawing depicting an example of the display screen displayed on the display unit according to embodiment 1 of the present disclosure.
Figure 7:
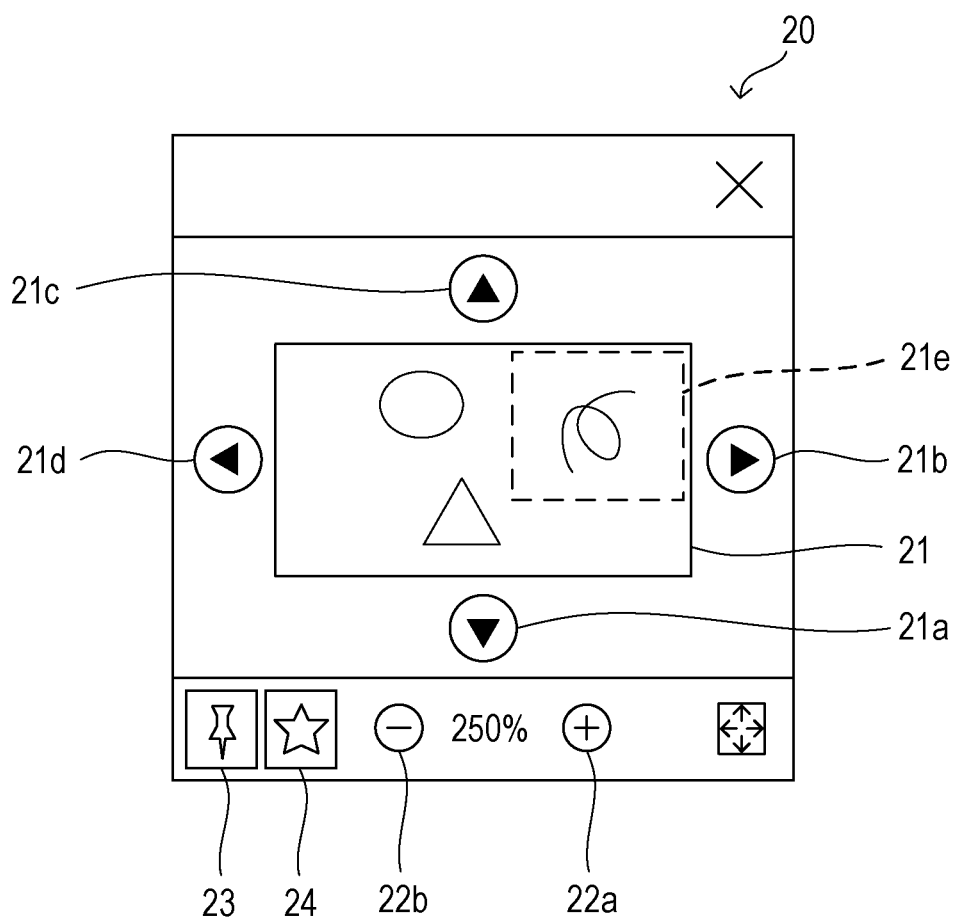
FIG. 7 is a drawing depicting an example of an enlargement menu displayed on the display unit according to embodiment 1 of the present disclosure.

Hereinafter, a description will be given with reference to FIGS. 5 to 10 regarding an example of a procedure for bookmark registration processing executed by the control unit 210 of the control device 200. The aforementioned bookmark registration processing is an example of an information processing method of the present disclosure. FIG. 5 depicts the display screen 10 for a case where the user has drawn the objects A1, A2, and A3 as drawing information by means of the touch pen 300 on the touch panel 110. FIG. 6 depicts the display screen 10 for a case where the position (region) where the object A2 is displayed from within the region of the entire sheet 10a has been set to a display magnification of 250%. FIG. 7 depicts a state in which way the enlargement menu 20 depicted in FIG. 6 has been enlarged.

Figure 8:
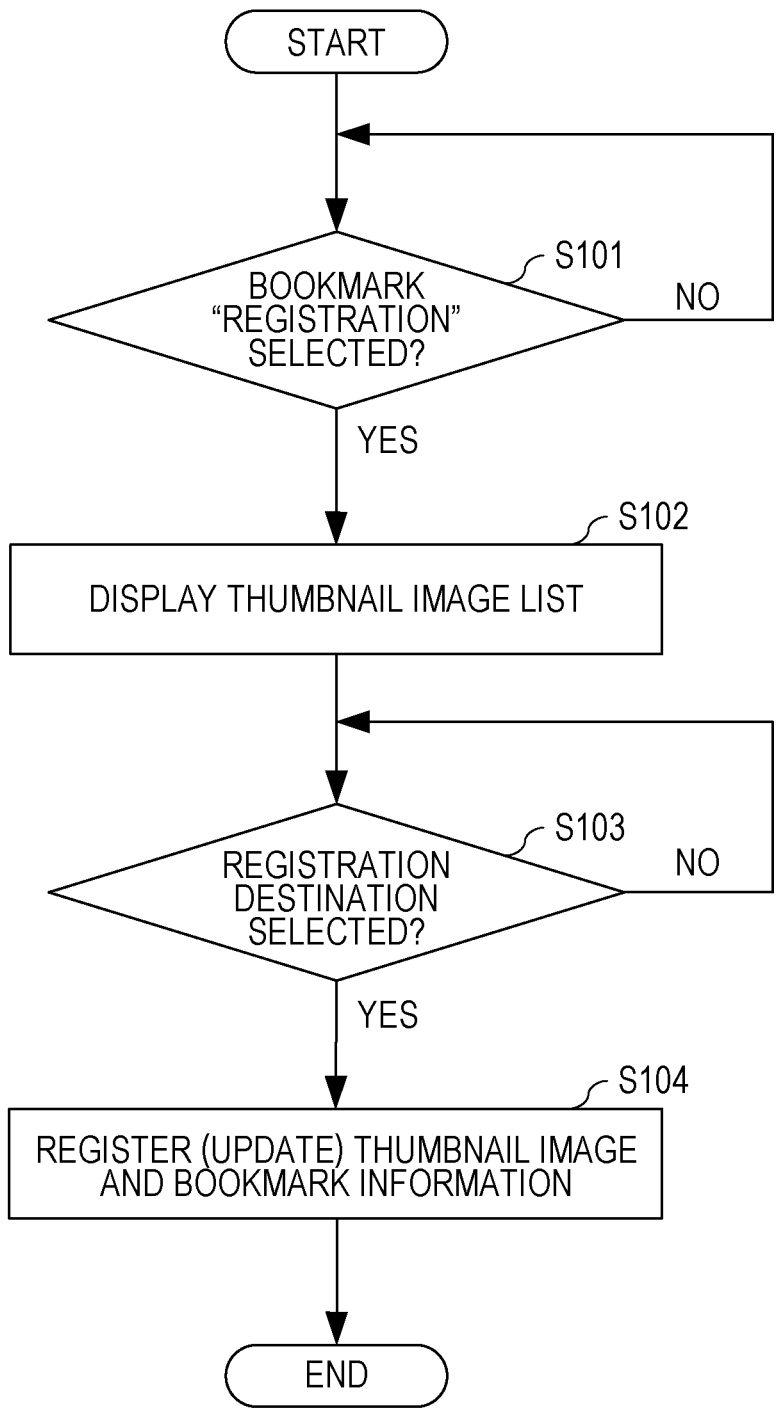
FIG. 8 is a flowchart for describing an example of a procedure for bookmark registration processing in a control device according to embodiment 1 of the present disclosure.
Figure 9:
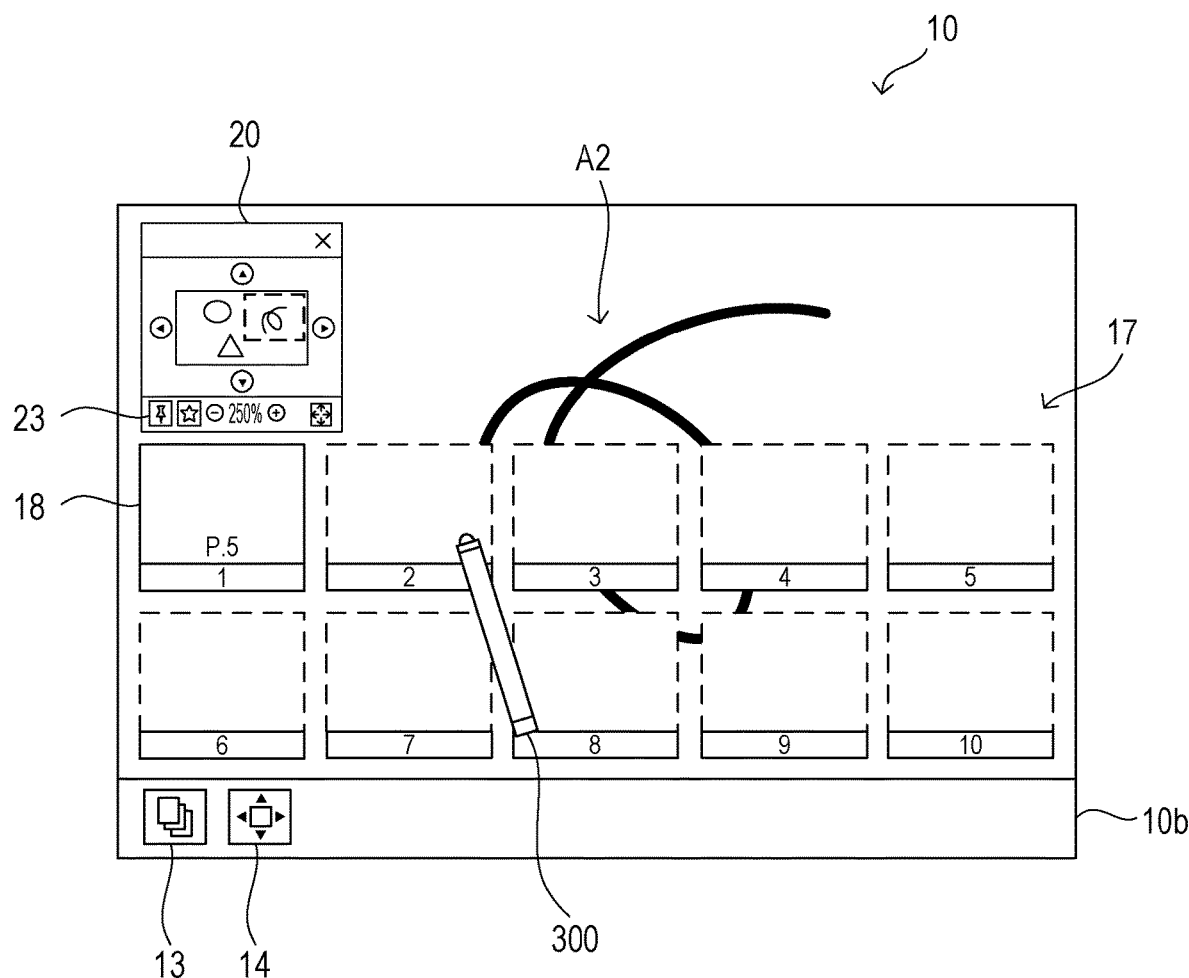
FIG. 9 is a drawing depicting an example of a thumbnail image field displayed on the display unit according to embodiment 1 of the present disclosure.

In step S101 in FIG. 8, in a case where the user has touched the bookmark registration button 23 on the display screen 10 depicted in FIG. 6 (S101: yes), the display control unit 212 causes thumbnail images 18 of the sheets 10a registered as bookmarks, and registration frames (for example, dashed frames) for newly registering as bookmarks, to be displayed in the thumbnail image registration field 17 depicted in FIG. 9 (S102). The thumbnail image registration field 17 depicted in FIG. 9 displays 10 (bookmark numbers "1" to "10") registration frames (registration spaces) that have been set in advance. Here, it is depicted that bookmark number "1" has been registered and bookmark numbers "2" to "10" are unregistered. The setting information 222 (sheet number, display magnification, and display position) of the sheets 10a registered as bookmarks is stored in the storage unit 220 (see FIG. 4). FIG. 9 depicts that the sheet 10a having sheet number "5" (P.5) has been registered as a bookmark to bookmark number "1".

Figure 10:
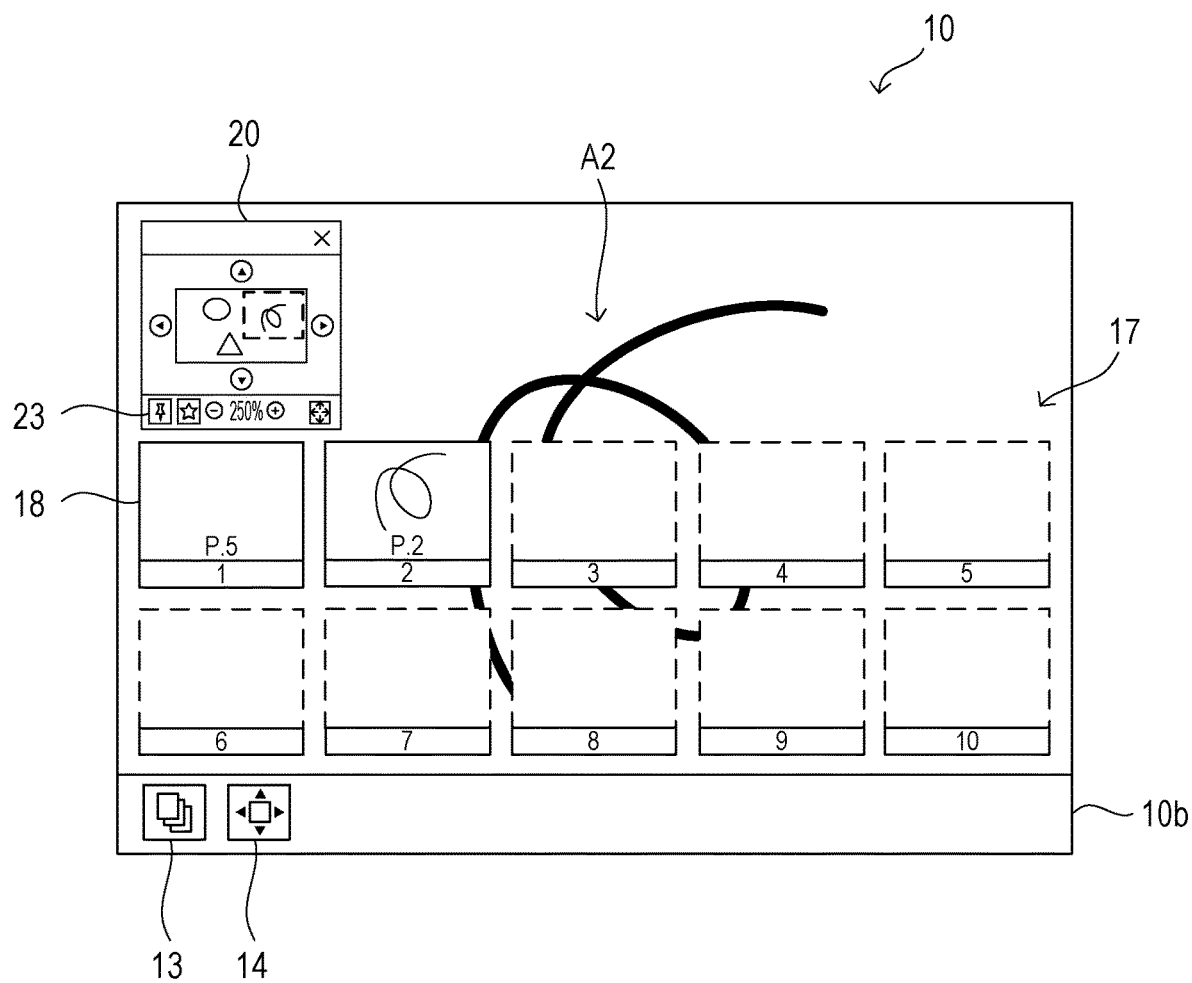
FIG. 10 is a drawing depicting an example of the thumbnail image field displayed on the display unit according to embodiment 1 of the present disclosure.

In step S103, in a case where the user has touched (selected) a desired registration destination (a registration frame or a registered thumbnail image) in the thumbnail image registration field 17 (S103: yes), the bookmark processing unit 213 registers a thumbnail image 18 for the sheet 10a to be registered as a bookmark, to the selected registration destination (S104). FIG. 9 depicts a state in which the registration frame for bookmark number "2" has been selected by means of the touch pen 300. As depicted in FIG. 10, the bookmark processing unit 213 displays the thumbnail image 18 having sheet number "2" in the registration frame having bookmark number "2" in accordance with the setting information 222 indicating the current display state (display magnification and display Position), and displays the information "P.2" for sheet number "2" on the displayed thumbnail image 18. Furthermore, the bookmark processing unit 213 stores the setting information 222 in the storage unit 220 (see FIG. 4). Here, the information "2" for the sheet number of the sheet 10a, the information "x2, y2" for the display position of the object A2 with respect to the region of the entire sheet 10a, and the information "250%" for the display magnification are stored in association with bookmark number "2" of the selling information 222 (see FIG. 4).

Note that, in a case where the user has selected a registration frame that has already been registered as a bookmark (registered thumbnail image) in the thumbnail image registration field 17, the bookmark processing unit 213 updates the thumbnail image 18 (registered thumbnail image) displayed in the registration frame to a thumbnail image 18 of the sheet 10a to be newly registered as a bookmark. Furthermore, the bookmark processing unit 213 updates the setting information 222 stored in the storage unit 220 to the setting information 222 corresponding to the sheet 10a to be newly registered as a bookmark.

Note that the display control unit 212 may cause identification information (flags) to be displayed in thumbnail images 18 registered as bookmarks by the bookmark processing unit 213, in a thumbnail image list in which a plurality of sheets 10a are listed and displayed. The user is thereby able to easily confirm sheets 10a that have been registered as bookmarks, in the thumbnail image list of the sheets 10a.

[Bookmark Read Processing]

Hereinafter, a description will be given with reference to FIGS. 11 to 13 regarding an example of a procedure for bookmark read processing executed by the control unit 210 of the control device 200. The aforementioned bookmark read processing is an example of an information processing method of the present disclosure.

Figure 11:
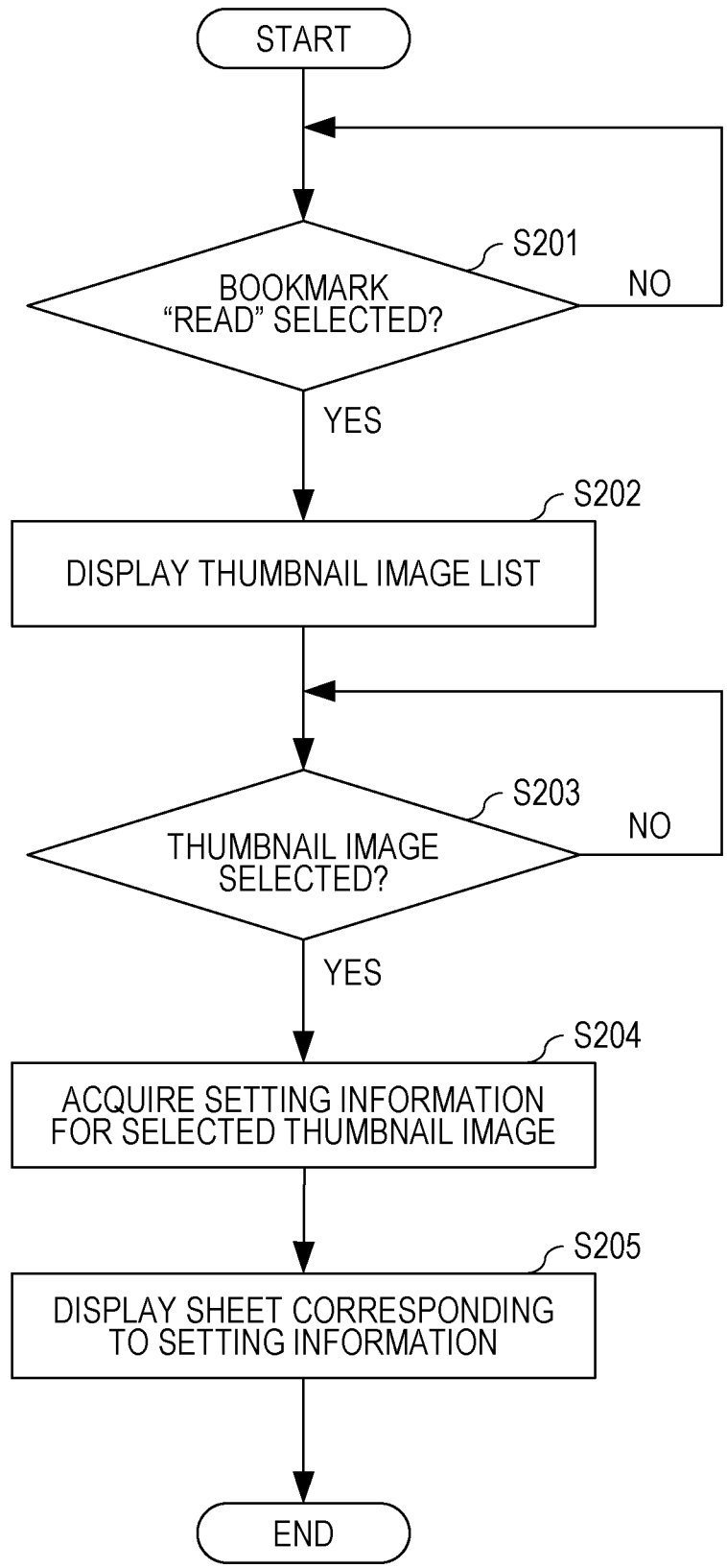
FIG. 11 is a flowchart for describing an example of a procedure for bookmark read processing in the control device according to embodiment 1 of the present disclosure.
Figure 12:
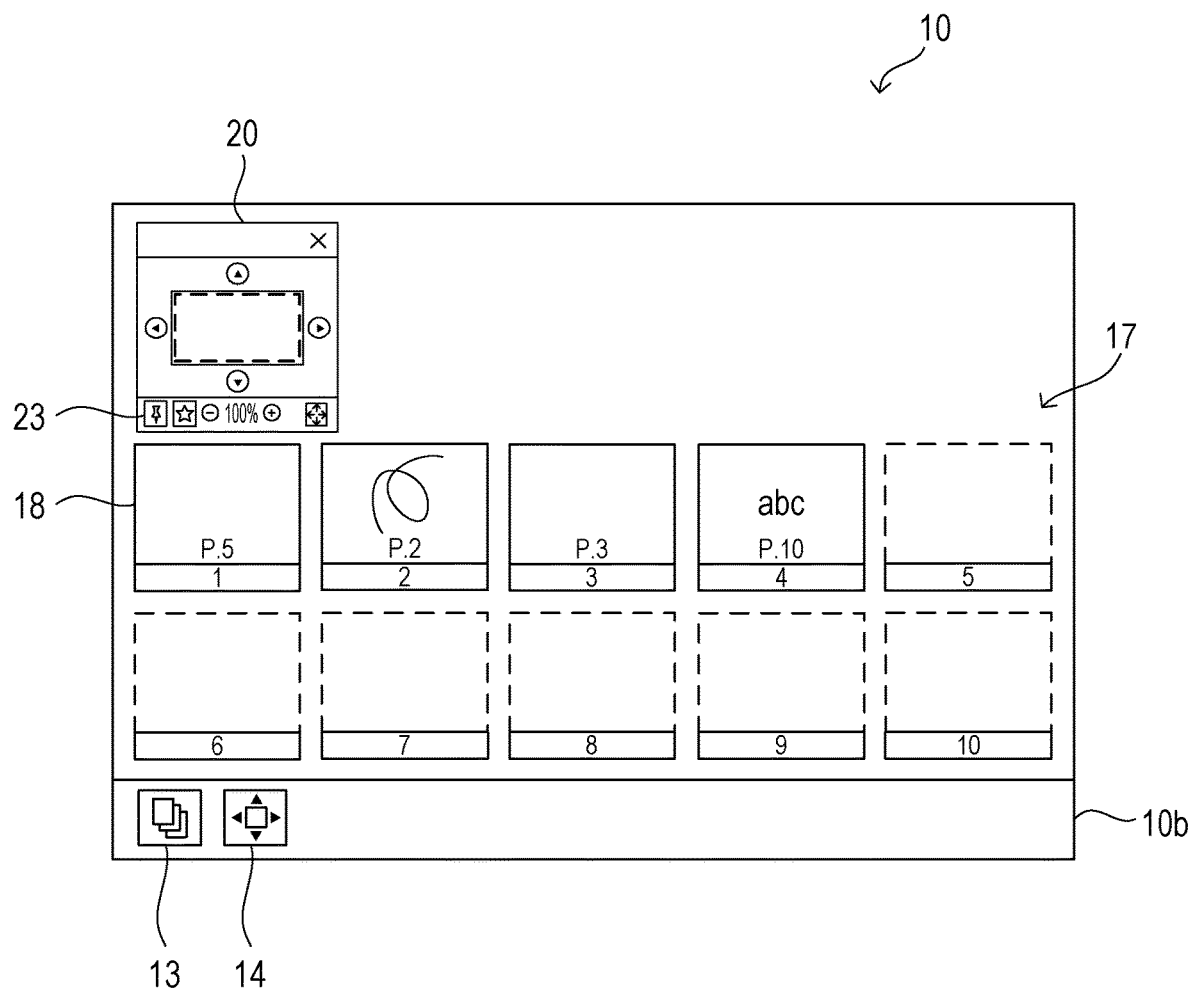
FIG. 12 is a drawing depicting an example of the thumbnail image field displayed on the display unit according to embodiment 1 of the present disclosure.

In step S201 in FIG. 11, in a case where the user has touched the operation button 14 and caused the enlargement menu 20 to be displayed, and the user has touched the bookmark read button 24 in the enlargement menu 20 (S201: yes), the display control unit 212 causes the thumbnail image 18 of one or more sheets 10a registered as bookmarks to be listed and displayed in the thumbnail image registration field 17 of the display screen 10, as depicted in FIG. 12 (S202).

Note that the number of thumbnail images 18 displayed on the display screen 10 is not restricted to 10 and may be higher. Furthermore, a configuration may be adopted in which the number of thumbnail images 18 displayed can be altered. Furthermore, in a case where all thumbnail images 18 do not fit within the display region of the display screen 10, a configuration may be adopted in which the display screen 10 can be scrolled, or in which the display size of the thumbnail images 18 can be altered according to the number displayed so as to fit within the display region. Furthermore, the list of thumbnail images 18 may be displayed in a predetermined position that is set in advance or may be displayed in an arbitrary position, and is desirably displayed with a size at which the display content can be reliably viewed.

In step S203, in a case where the user has touched (selected) a desired thumbnail image 18 registered as a bookmark from among the plurality of thumbnail images 18 (see FIG. 12) listed and displayed (S203: yes), the bookmark processing unit 213 acquires the setting information 222 corresponding to the selected thumbnail image 18 from the storage unit 220 (S204). For example, in a case where the thumbnail image 18 having sheet number "2" has been selected, the bookmark processing unit 213 acquires the information "2" for the sheet number, the information "x2, y2" for the display position of the object A2, and the information "250%" for the display magnification, as the setting information 222 corresponding to sheet number "2", from the storage unit 220.

Figure 13:
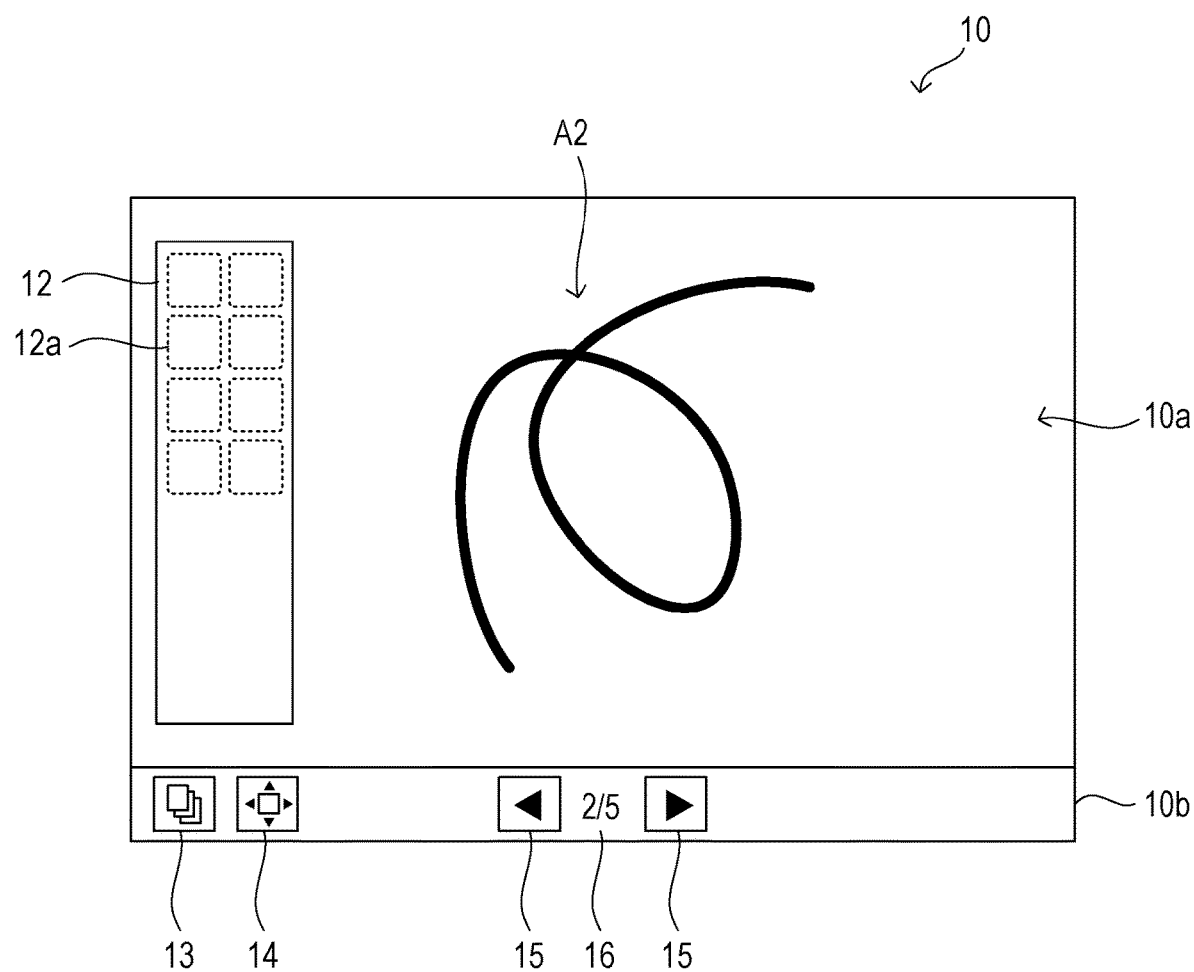
FIG. 13 is a drawing depicting an example of the display screen displayed on the display unit according to embodiment 1 of the present disclosure.

In step S205, the display control unit 212 causes the sheet 10a having sheet number "2" to be displayed on the display unit 120 on the basis of the acquired setting information 222 (see FIG. 13). Specifically, the display control unit 212, from, within, the sheet 10a having sheet number "2", causes the display content (here, the object A2) corresponding to the display position (position coordinates (x2, y2)) included, in the acquired, setting information 222, to be displayed on the display unit 120 at a size that corresponds to the display magnification (here, 250%) included in the acquired setting information 222. In this way, the setting information 222 does not include information (image information or the like) drawn on the sheet 10a, and includes only information that defines the display state (display mode).

As mentioned above, according to the information processing device 1 in embodiment 1 of the present disclosure, the user registers, as a bookmark, a sheet 10a on which information (text or the like) has been written, and the user is able to easily read out the sheet 10a in a case where the user wishes to reuse the sheet 10a thereafter. Furthermore, the sheet 10a can be read out in the display state that was in effect when registered as a bookmark, and the user is therefore able to easily review and look back upon sections previously considered to be important and previous thinking.

Note that, in the bookmark read processing, the display control unit 212 may display a sheet 10a registered as a bookmark on the display unit 120 at a size that corresponds to the initially set display magnification (for example, 100%) regardless of the display magnification included in the setting information 222 (for example, 250%). In the aforementioned example, for instance, in a case where the thumbnail image 18 having sheet number "2" has been selected in the thumbnail image registration field 17 of the display screen 10 depicted in FIG. 12, the display control unit 212 may cause the entire sheet 10a (display magnification: 100%) to be displayed on the display unit 120 as depicted in FIG. 2. The user is thereby able to confirm a section that was important when registered as a bookmark by means of the thumbnail images 18 in the thumbnail image registration field 17, and it becomes easy to carry out editing work on the entire sheet 10a that has been redisplayed.

The aforementioned setting information 222 may also include registration time information indicating the time when registered as a bookmark, ranking information indicating the degree of importance of a sheet 10a registered as a bookmark, or the like in addition to the information depicted in FIG. 4. In this case, in the thumbnail image registration field 17, the display control unit 212 may decide the display order of the thumbnail images 18, or may alter the display mode of the thumbnail images 18 (the background color of a sheet 10a, the color or line type of the frame of a sheet 10a, or the like), on the basis of the time information, the ranking information, or the like.

Here, the operation described hereinafter is carried out in a case where the page number of a sheet 10a registered as a bookmark is altered. For example, in a case where the sheet 10a having page number: "2" is registered as a bookmark to bookmark number "2" and then, for example, the sheet 10a having page number: "2" is moved to page number: "1" due to the sheet 10a having page number "1" being deleted, the display control unit 212 causes the sheet 10a having page number "1" to be displayed on the display screen 10 if the user has selected the registered frame (thumbnail image 18) having bookmark number "2" in the thumbnail image registration field 17. At such time, the display control unit 212 causes the sheet 10a to be displayed in a mode that corresponds to the setting information 222 (display magnification and display position) for page number "1" that is the movement destination.

Embodiment 2

Figure 14:
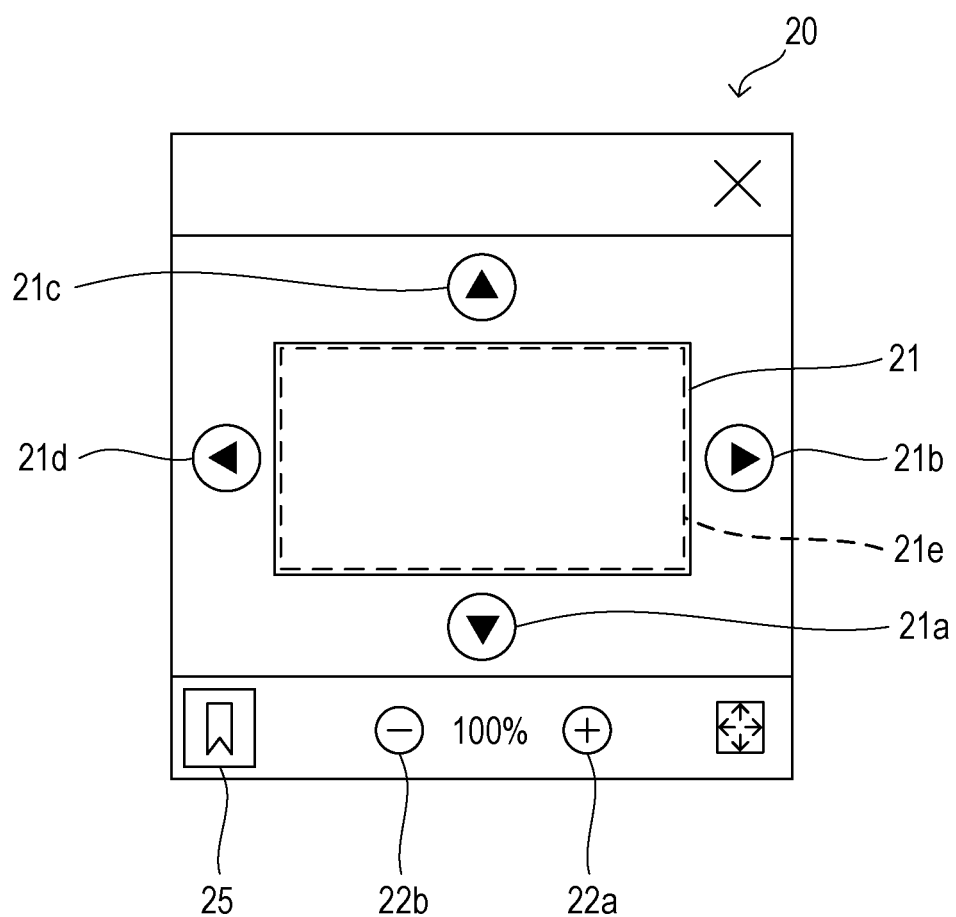
FIG. 14 is a drawing depicting an example of an enlargement menu displayed on a display unit according to embodiment 2 of the present disclosure.

The enlargement menu 20 is not restricted to the configuration depicted in FIG. 3 and may have the configuration depicted in FIG. 14. FIG. 14 is a drawing depicting an example of the enlargement menu 20 in the information processing device 1 according to embodiment 2. As depicted in FIG. 14, in the enlargement menu 20 according to embodiment 2, the bookmark registration button 23 and the bookmark read button 24 in the enlargement menu 20 according to embodiment 1 (see FIG. 3) are omitted, and a bookmark thumbnail display button 25 (corresponding to a display operation unit of the present disclosure) is included. The bookmark thumbnail display button 25 is a button that receives an operation for displaying the thumbnail image registration field 17 (corresponding to a registration list of the present disclosure) depicted in FIG. 15 on the display screen 10.

The information processing device 1 according to embodiment 2 executes bookmark registration processing and bookmark read processing as described hereinafter. The user touches (selects) the bookmark thumbnail display button 25 in the enlargement menu 20 in a case where the user wishes to register the sheet 10a displayed on the display screen 10 as a bookmark, and in a case where the user wishes for a sheet 10a registered as a bookmark to be displayed on the display screen 10. When the user touches the bookmark thumbnail display button 25, the display control unit 212 causes the thumbnail image registration field 17 to be displayed on the display screen 10.

Figure 15:
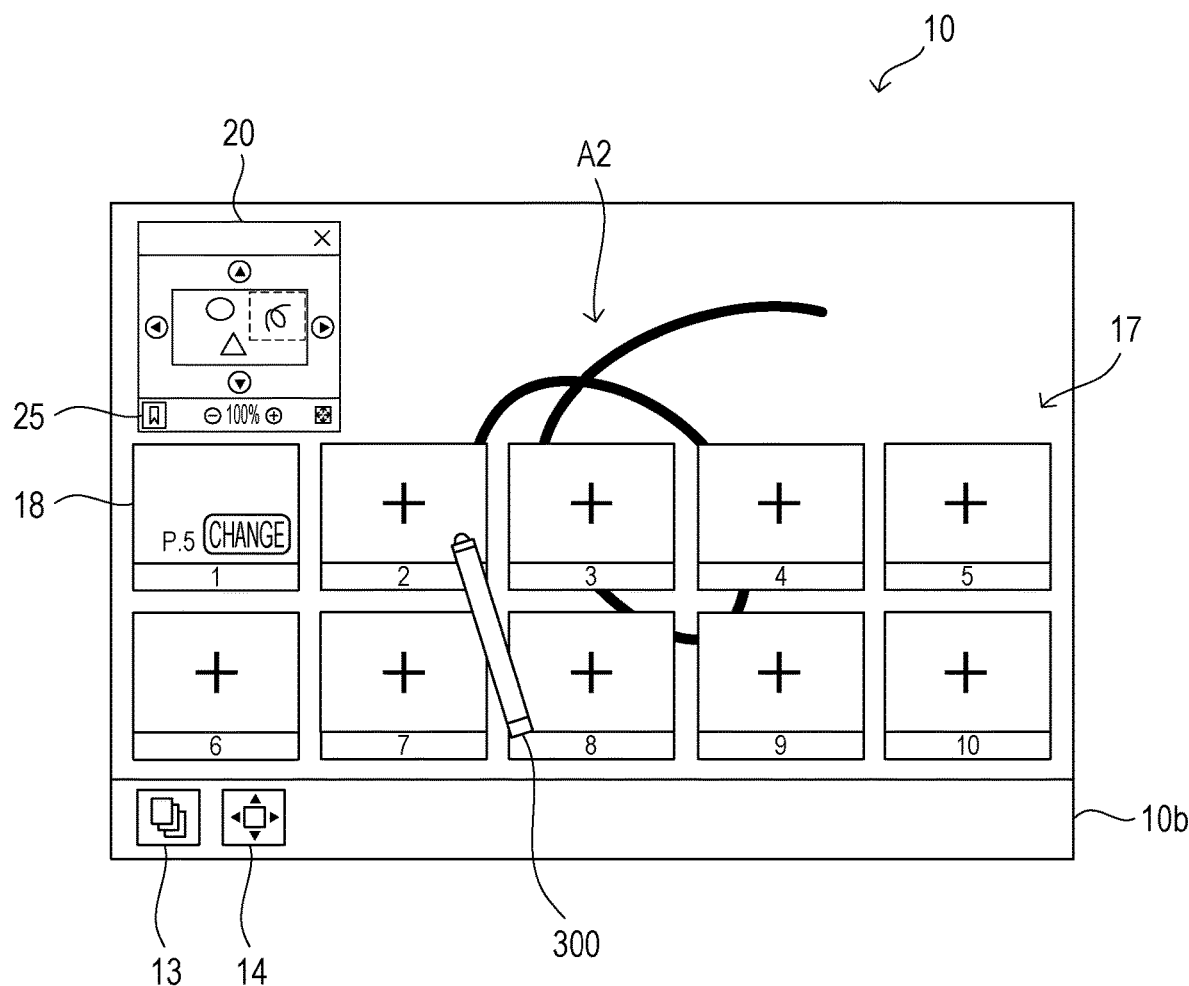
FIG. 15 is a drawing depicting an example of a thumbnail image registration field displayed on the display unit according to embodiment 2 of the present disclosure.

FIG. 15 depicts the thumbnail image registration field 17 displayed on the display screen 10 in a case where the user has touched the bookmark thumbnail display button 25. The thumbnail image registration field 17 includes a plurality of preset registration frames (10 here). The plurality of registration frames include a registered frame (bookmark number "1" in FIG. 15) in which a sheet 10a that has already been registered as a bookmark is displayed as a thumbnail image 18, and unregistered frames (bookmark numbers "2" to "10") that indicate not having been registered as a bookmark. A "+" mark is displayed in the unregistered frames in the thumbnail image registration field 17. Note that the plurality of registration frames are all unregistered frames in a case where there are no sheets 10a that have been registered as bookmarks, and the plurality of registration frames are all registered frames in a case where the sheets 10a registered as bookmarks have reached the preset number of registration frames (for example, 10).

Figure 16:
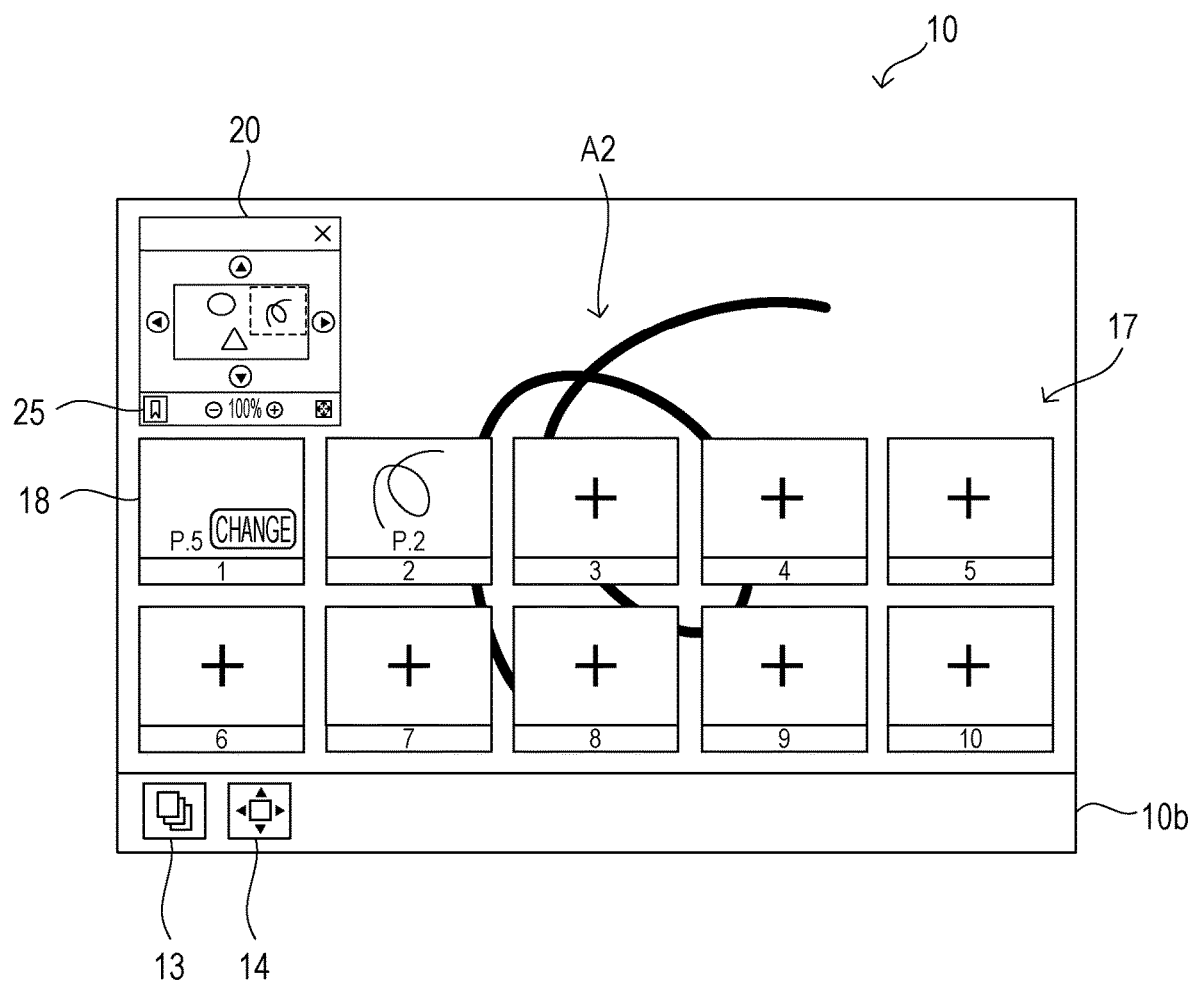
FIG. 16 is a drawing depicting an example of the thumbnail image registration field displayed on the display unit according to embodiment 2 of the present disclosure.

In the bookmark registration processing, for example, in a case where the user is to register the sheet 10a displayed on the display screen 10 as a bookmark, the user touches any of the unregistered frames ("+"). Here, when the user touches the bookmark number "2", as depicted in FIG. 16, a region (display position "x2, y2") that includes the object A2 from within the region of the entire sheet 10a is registered as a bookmark to bookmark number "2" at a display magnification of "250%".

Furthermore, in a case where the user is to register the sheet 10a displayed on the display screen 10 as a bookmark, the user may save the sheet 10a to be newly registered as a bookmark by overwriting a registered sheet 10a. For example, on the display screen 10 depicted in FIG. 15, when the user touches a "change" button in the registered frame for bookmark number "1", as depicted in 17, a region (display position "x2, y2") that includes the object A2 from, within the region of the entire sheet 10a is registered (overwritten and saved) as a bookmark to bookmark number "1" at a display magnification of "250%".

Figure 17:
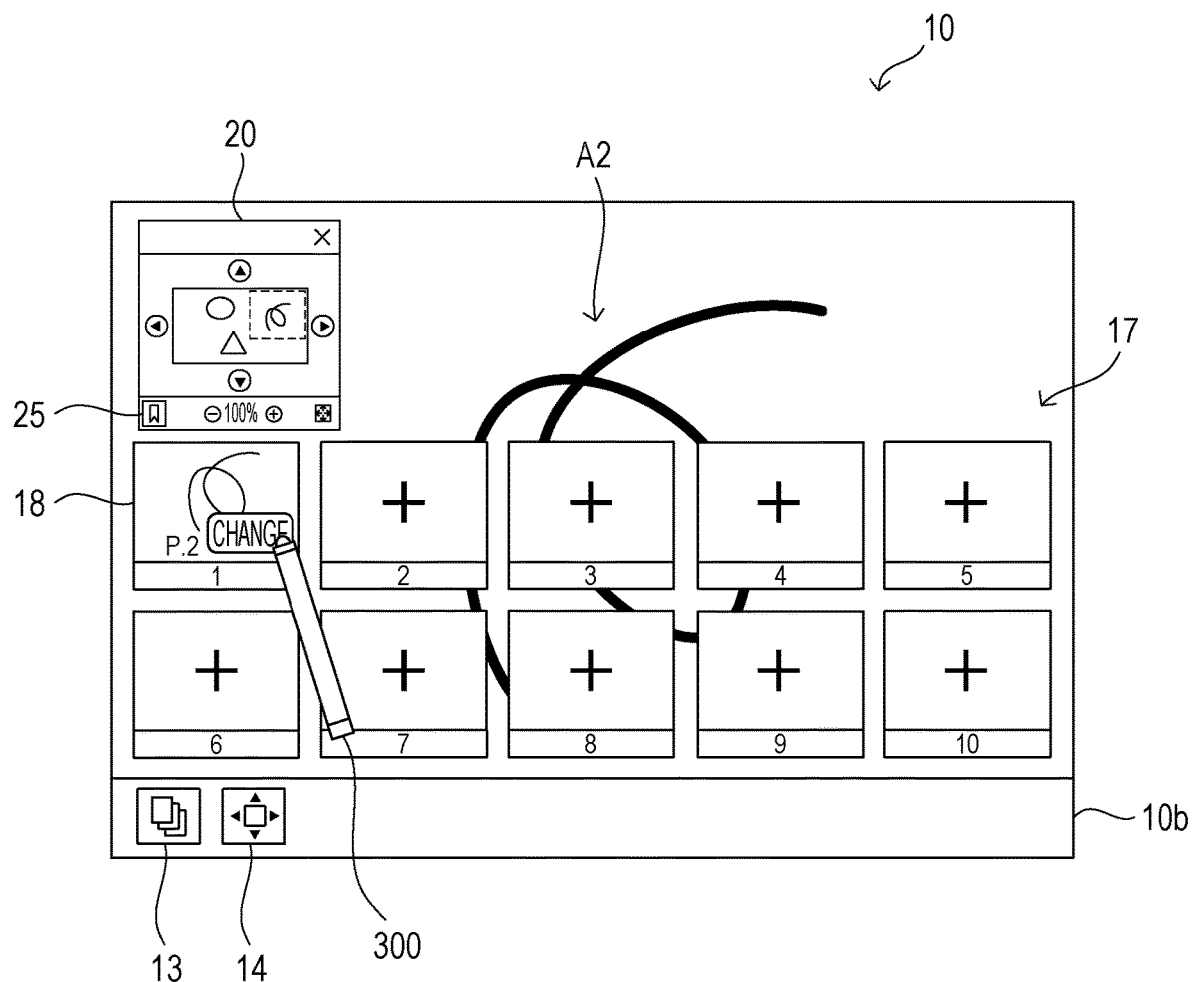
FIG. 17 is a drawing depicting an example of the thumbnail image registration field displayed on the display unit according to embodiment 2 of the present disclosure.

In this way, in a case where the user has touched (selected) any of the registration frames from among the plurality of preset registration frames (registered frames and unregistered frames) in the thumbnail image registration field 17, the bookmark processing unit 213 registers the thumbnail image 18 for the sheet 10a to be registered as a bookmark, to the selected registration frame. Note that the thumbnail images 18 are displayed in a mode that corresponds to altered setting information 222 (display magnification and display position) (see FIGS. 16 and 17). Note that, for example, in a case where the sheet 10a registered as a bookmark to bookmark number "1" is deleted, in the registration frame for bookmark number "1" in the thumbnail image registration field 17, the thumbnail image for the sheet 10a is deleted and the "+" mark (unregistered frame) is displayed.

In the bookmark read processing, in a case where the user wishes for a sheet 10a registered as a bookmark to be displayed, the user touches the bookmark thumbnail display button 25 and causes the thumbnail image registration field 17 to be displayed on the display screen 10. Next, the user touches the thumbnail image 18 of the desired registered frame (for example, the registered frame having bookmark number "2") from within the thumbnail image registration field 17 displayed on the display screen 10. When the user touches the thumbnail image 18, the display control unit 212 causes the sheet 10a having sheet number "2" to be displayed on the display unit 120 on the basis of the setting information 222. Specifically, from within the sheet 10a having sheet number "2", the display control unit 212 causes the display content (here, the object A2) corresponding to the display position (position coordinates (x2, y2)) included in the acquired setting information 222 to be displayed on the display unit 120 at a size that corresponds to the display magnification (here, 250%) included in the setting information 222 (see FIG. 13).

In this way, in a case where the user has touched (selected) a registered frame (thumbnail image 18) registered in the thumbnail image registration field 17, the display control unit 212 causes the sheet 10a to be displayed in a mode that corresponds to the setting information 222 (display magnification and display position). In the information processing device 1 according to embodiment 2, operations can be performed on the same operation screen (see FIGS. 15 to 17) in either of the case where a sheet 10a is to be registered as a bookmark and the case where a sheet 10a that has been registered as a bookmark is to be read out and displayed, and therefore operability can be improved. In other words, for example, on the display screen 10 depicted in FIG. 15, when the user touches the thumbnail image 18 having bookmark number "1", the sheet 10a having sheet number "5" is displayed on the display unit 120, when the user touches the "change" button for bookmark number "1", the sheet 10a displayed on the display screen 10 is saved and overwritten to the bookmark having bookmark number "1", and when the user touches the unregistered frame ("+") having bookmark number "2", the sheet 10a displayed on the display screen 10 is newly registered as the bookmark having bookmark number "2". The rest of the configuration of the information processing device 1 according to embodiment 2 is the same as the configuration of the information processing device 1 according to embodiment 1.

Note that, in the bookmark read processing, the display control unit 212 may display a sheet 10a registered as a bookmark on the display unit 120 at a size that corresponds to the initially set display magnification (for example, 100%) regardless of the display magnification included in the setting information 222 (for example, 250%). In the aforementioned example, for instance, in a case where the thumbnail image 18 having sheet number "2" has been selected in the thumbnail image registration field 17 of the display screen 10 depicted in FIG. 16, the display control unit 212 may cause the entire sheet 10a (display magnification: 100%) to be displayed on the display unit 120 as depicted in FIG. 2. The user is thereby able to confirm a section that was important when registered as a bookmark by means of the thumbnail images 18 in the thumbnail image registration field 17, and it becomes easy to carry out editing work on the entire sheet 10a that has been redisplayed.

Embodiment 3

Figure 18:
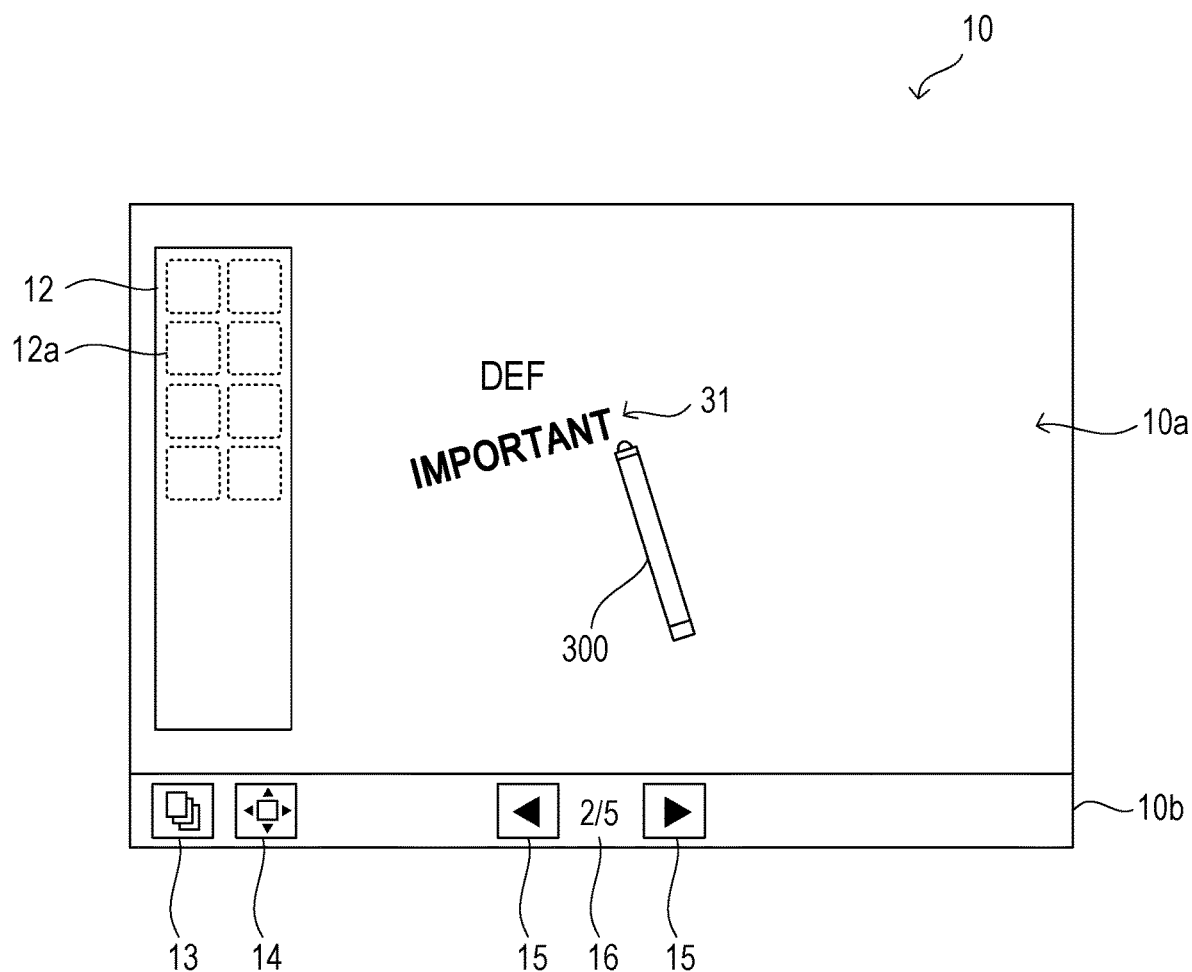
FIG. 18 is a drawing depicting an example of a display screen displayed on a display unit according to embodiment 3 of the present disclosure.
Figure 19:
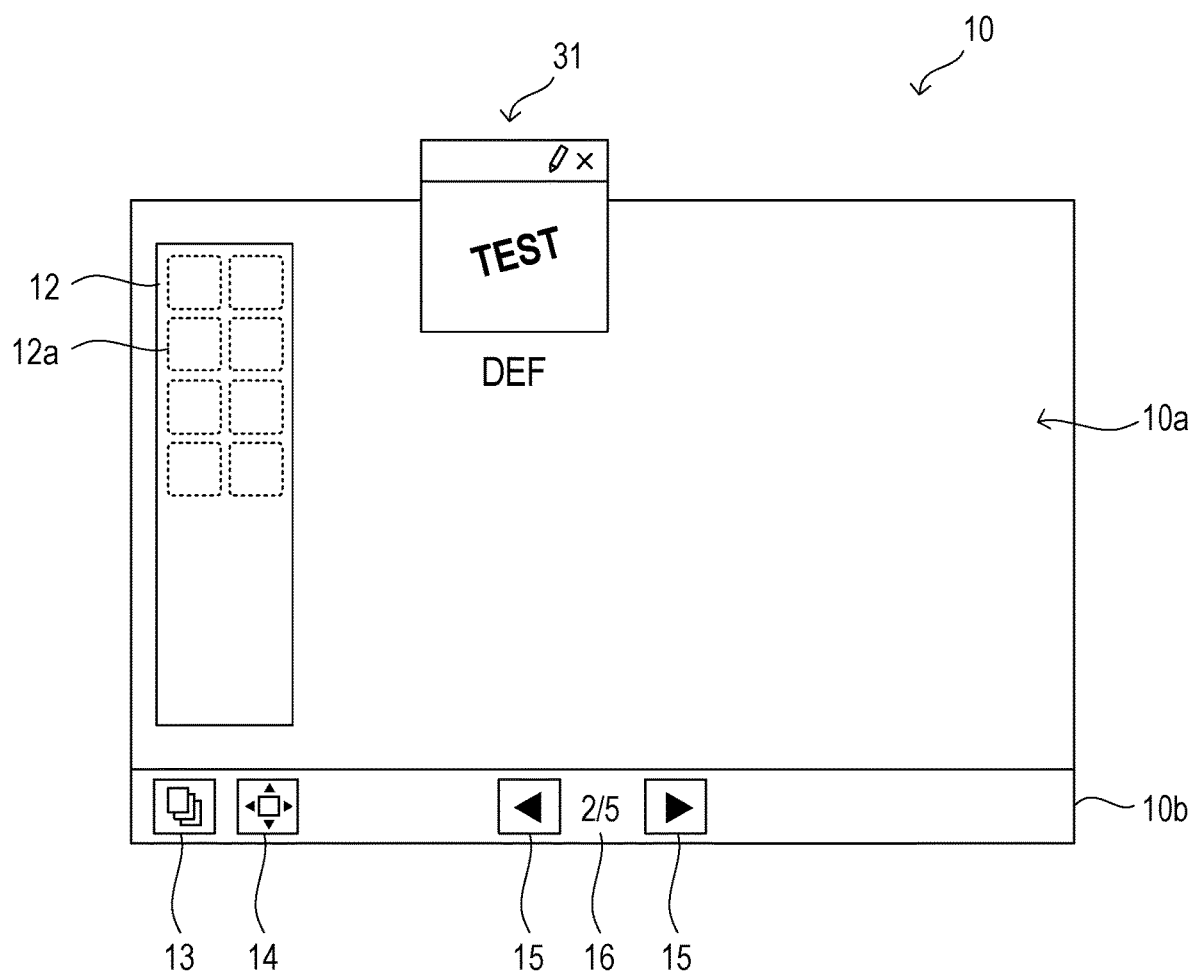
FIG. 19 is a drawing depicting an example of the display screen displayed on the display unit according to embodiment 3 of the present disclosure.

The bookmark registration processing is not restricted to the configurations of embodiments 1 and 2. In the information processing device 1 according to embodiment 3, in a case where predetermined information 31 has been added to the sheet 10a by the user, the bookmark processing unit 213 detects the predetermined information 31 and executes bookmark registration processing. The predetermined information 31 is information that is added in order to indicate that the information written on the sheet 10a by the user is important information. For example, the predetermined information 31 includes text information such as "important", "significant", or "confirm", color information such as red or blue, mark information such as "○" or "⊙", registration object information attached to a sheet 10a such as a tag, or the like. The predetermined information 31 is information that is set in advance, and is stored in the storage unit 220 in advance. FIG. 18 depicts a state in which the text "important" (predetermined information 31) has been written near the handwritten text "DEF" by the user (touch pen 300). Furthermore, FIG. 19 depicts a state in which registration object information (predetermined information 31) of a tag has been attached near the handwritten text "DEF" by the user.

In the information processing device 1 according to embodiment 3, the bookmark processing unit 213 executes the bookmark registration processing depicted in FIG. 20.

In step S301, the bookmark processing unit 213 determines whether or not predetermined information 31 has been detected in a sheet 10a. In a case where the bookmark processing unit 213 has detected predetermined information 31 (S301: yes), processing transitions the step S302. Steps S302 to S304 are the same as steps S102 to S104 in the bookmark registration processing of embodiment 1 depicted in FIG. 8.

Here, upon detecting predetermined information 31, the bookmark processing unit 213 registers, as a bookmark, the sheet 10a in which a region of a predetermined range centered about the predetermined information 31 is enlarged. The predetermined range may be set in advance, or it may be possible for the predetermined range to be set when the user registers a sheet 10a as a bookmark.

As mentioned above, according to the information processing device 1 in embodiment 3 of the present disclosure, a sheet 10a of a predetermined range is automatically registered as a bookmark due to the user adding predetermined information 31 to a section determined as being important. The sheet 10a can thereafter be easily read out in a case where the user wishes to reuse the sheet 10a. Furthermore, the sheet 10a can be read out in the display state that was in effect when registered as a bookmark, and the user is therefore able to easily review and look back upon sections previously considered to be important and previous thinking.

Embodiment 4

In the information processing device 1 according to embodiment 4, the bookmark processing unit 213 executes bookmark registration processing on the basis of a predetermined operation performed by means of the touch pen 300. The predetermined operation, for example, is an operation in which the touch panel 110 is pressed for a long time by the touch pen 300, an operation in which the touch panel 110 is pressed for a long time while a switch (not depicted) of the touch pen 300 is pressed, an operation in which the touch panel 110 is touched by one hand of the user while the touch panel 110 is pressed for a long time by the touch pen 300 with the other hand, or the like. The bookmark processing unit 213 executes the bookmark registration processing upon detecting the predetermined operation.

Embodiment 5

In the information processing device 1 according to embodiment 5, the bookmark processing unit 213 executes bookmark registration processing on the basis of a predetermined gesture operation performed by the user. The predetermined operation, for example, is an operation in which the user uses a finger to perform a long press, a swipe, or a double-click on the touch panel 110, or the like. The bookmark processing unit 213 executes the bookmark registration processing upon detecting the predetermined gesture operation.

Embodiment 6

The bookmark read processing is not restricted to the configurations of embodiments 1 and 2. In the information processing device 1 according to embodiment 6, in a case where the user has selected a desired thumbnail image from among thumbnail images listed and displayed, the display control unit 212 affixes an image of the sheet 10a corresponding to the selected thumbnail image to a new sheet 10a and displays such. In this case, the displayed sheet 10a may be a sheet 10a of the same file or may be a sheet 10a of a newly generated file. It thereby becomes possible for important content to not only be displayed but also be managed as a separate file to which new information has been added. Note that information (a filename or the like) that associates the new file and the original file may be added to the new file. Furthermore, an operation screen for adding the information may be displayed and selected by the user.

Note that it is also possible for the information processing device 1 according to the present disclosure to be configured by freely combining the embodiments given hereinabove, or by modifying or partially omitting the embodiments as appropriate, within the scope of that described in the claims.

The present disclosure contains subject matter related to that disclosed in Japanese Priority Patent Application JP 2018-100187 filed in the Japan Patent Office on May 25, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An information processing device comprising:
a display that displays a sheet on which an object has been arranged; and
a controller that controls the display, wherein the controller,
upon receiving, from a user, a registration operation for registering, as a bookmark, the sheet displayed on the display so that the sheet can be reused, causes the display to display a registration list that lists a plurality of preset registration frames for registering, as the bookmark, the sheet displayed on the display, and
registers an image of the sheet displayed on the display, as the bookmark, to a registration frame selected by the user from among the plurality of preset registration frames displayed on the display, in a current display state that includes at least a current display magnification and a current display position, and stores the display magnification and the display position in a storage, and
upon selection of a thumbnail image of the sheet displayed on the display after the image of the sheet is registered as the bookmark, acquires the display magnification and the display position from the storage and displays the image of the sheet based on the display magnification and the display position, wherein
the storage stores, in association with each other, information representing a registration number of the bookmark, information representing a sheet number of the sheet, information representing the display position of the sheet, and information representing the display magnification of the sheet.

2. The information processing device according to claim 1, wherein, in a case where setting information, indicating a display state of the sheet displayed on the display, has been altered by the user, the controller registers the sheet for which the setting information has been altered, as the bookmark to the selected registration frame.

3. The information processing device according to claim 2, wherein the plurality of preset registration frames include:
a registered frame in which the sheet that has already been registered as the bookmark is displayed as a thumbnail image; and
an unregistered frame that indicates not having been registered as the bookmark.

4. The information processing device according to claim 3, wherein the controller causes the thumbnail image of the sheet to be displayed in the registered frame in a display state that corresponds to the altered setting information.

5. The information processing device according to claim 4,
wherein, in a case where the registered frame has been selected by the user from among the plurality of preset registration frames displayed on the display, the controller causes the sheet corresponding to the selected registered frame to be displayed on the display in the display state that corresponds to the altered setting information or an initially set display state.

6. The information processing device according to claim 2, wherein the setting information includes:
information indicating a display position displayed on the display from within the sheet;
information indicating a display magnification of the sheet; and
information indicating a number of the sheet.

7. The information processing device according to claim 2,
wherein the controller causes the display to display an enlargement menu that receives an operation for registering, as the bookmark, the sheet displayed on the display,
the enlargement menu includes a display region in which the sheet is displayed, a position operation region that receives a movement operation for a position of the sheet displayed on the display, a magnification operation region that receives an alteration operation for a display magnification of the sheet, and a display operation region that receives a display operation that causes the display to display the registration list,
the controller causes the display to display the registration list in a case where the display operation has been received, and
the controller registers the sheet for which the setting information has been altered, as the bookmark to the registration frame in a case where the registration frame has been selected by the user in the registration list displayed on the display.

8. An information processing method including:
receiving, from a user, a registration operation for registering, as a bookmark, a sheet on which an object has been arranged, the sheet displayed on a display so that the sheet can be reused;
in a case where the registration operation has been received from the user, causing the display to display a registration list that lists a plurality of preset registration frames for registering, as the bookmark, the sheet displayed on the display; and
registering an image of the sheet displayed on the display, as the bookmark, to a registration frame selected by the user from among the plurality of preset registration frames displayed on the display, in a current display state that includes at least a current display magnification and a current display position, and storing the display magnification and the display position in a storage,
upon selection of a thumbnail image of the sheet displayed on the display after the image of the sheet is registered as the bookmark, acquiring the display magnification and the display position from the storage and displaying the image of the sheet based on the display magnification and the display position, wherein
the storage stores, in association with each other, information representing a registration number of the bookmark, information representing a sheet number of the sheet, information representing the display position of the sheet, and information representing the display magnification of the sheet.

9. A non-transitory recording medium stored a program for causing a computer to execute:
receiving, from a user, a registration operation for registering, as a bookmark, a sheet on which an object has been arranged, the sheet displayed on a display so that the sheet can be reused;
in a case where the registration operation has been received from the user, causing the display to display a registration list that lists a plurality of preset registration frames for registering, as the bookmark, the sheet displayed on the display; and
registering an image of the sheet displayed on the display, as the bookmark, to a registration frame selected by the user from among the plurality of preset registration frames displayed on the display, in a current display state that includes at least a current display magnification and a current display position, and storing the display magnification and the display position in a storage, and
upon selection of a thumbnail image of the sheet displayed on the display after the image of the sheet is registered as the bookmark, acquiring the display magnification and the display position from the storage and displaying the image of the sheet based on the display magnification and the display position, wherein
the storage stores, in association with each other, information representing a registration number of the bookmark, information representing a sheet number of the sheet, information representing the display position of the sheet, and information representing the display magnification of the sheet.

* * * * *